(12) United States Patent
MacInnes et al.

(10) Patent No.: US 10,792,575 B2
(45) Date of Patent: Oct. 6, 2020

(54) SYSTEM AND METHODS FOR PRIORITIZING CONTENT PACKETS BASED ON A DYNAMICALLY UPDATED LIST OF PROFILE ATTRIBUTES

(71) Applicant: DraftKings, Inc., Boston, MA (US)

(72) Inventors: Jason MacInnes, Delray, FL (US); Jordan Mendell, Boca Raton, FL (US)

(73) Assignee: DraftKings, Inc., Boston, MA (US)

( * ) Notice: Subject to any disclaimer, the term of this patent is extended or adjusted under 35 U.S.C. 154(b) by 38 days.

(21) Appl. No.: 16/287,724

(22) Filed: Feb. 27, 2019

(65) Prior Publication Data

US 2019/0262721 A1    Aug. 29, 2019

Related U.S. Application Data

(60) Provisional application No. 62/635,988, filed on Feb. 27, 2018.

(51) Int. Cl.
  *A63F 13/00*   (2014.01)
  *A63F 13/828*  (2014.01)
  *G07F 17/32*   (2006.01)

(52) U.S. Cl.
  CPC ........ *A63F 13/828* (2014.09); *G07F 17/3237* (2013.01); *G07F 17/3288* (2013.01)

(58) Field of Classification Search
  None
  See application file for complete search history.

(56) References Cited

U.S. PATENT DOCUMENTS

| | | | |
|---|---|---|---|
| 2006/0258421 A1 | 11/2006 | Nicholas et al. | |
| 2007/0204308 A1* | 8/2007 | Nicholas | H04N 21/222 725/86 |
| 2008/0096664 A1 | 4/2008 | Baray et al. | |
| 2008/0126476 A1* | 5/2008 | Nicholas | G06Q 10/10 709/203 |
| 2008/0281444 A1* | 11/2008 | Krieger | A63F 13/828 700/91 |

(Continued)

OTHER PUBLICATIONS

International Search Report and Written Opinion for PCT Appl. No. PCT/US2019/019849, dated May 6, 2019.

*Primary Examiner* — Paul A D'Agostino
(74) *Attorney, Agent, or Firm* — Foley & Lardner LLP

(57) ABSTRACT

A method for providing content items identifying recommendations includes identifying for a first user profile at least one active fantasy sports lineup including a list of players and one or more previous fantasy sports lineups, and generating, for a user, a recommendation profile including a plurality of relevance scores. The method further includes identifying a plurality of candidate recommendations, and determining, for each of the plurality of candidate recommendations, a match score indicating a level of relevance between the candidate recommendation and the recommendation profile. The method further includes prioritizing the plurality of candidate recommendations based on the relevance scores, and providing to a device associated with the first user profile, a content item identifying a selected candidate content management of the plurality of candidate recommendations based on the relevance score between the selected candidate recommendation and the recommendation profile.

20 Claims, 14 Drawing Sheets

(56) References Cited

U.S. PATENT DOCUMENTS

| | | |
|---|---|---|
| 2010/0093415 A1 | 4/2010 | Kasten |
| 2011/0237317 A1* | 9/2011 | Noonan ................ A63F 13/828 463/2 |
| 2012/0282995 A1* | 11/2012 | Allen .................. G07F 17/3239 463/22 |
| 2014/0004939 A1* | 1/2014 | Kasten .................... A63F 13/00 463/30 |
| 2014/0179442 A1* | 6/2014 | Quinlivan ............... A63F 13/65 463/43 |
| 2014/0194173 A1* | 7/2014 | Nicholas ................ A63F 13/31 463/9 |
| 2014/0274390 A1* | 9/2014 | Kasten .................... A63F 13/12 463/31 |
| 2016/0193532 A1* | 7/2016 | Nicholas ............ G06Q 30/0259 463/42 |
| 2016/0343037 A1* | 11/2016 | Nicholas ............... H04L 67/306 |
| 2017/0072321 A1 | 3/2017 | Thompson et al. |
| 2017/0201779 A1* | 7/2017 | Publicover ......... G06Q 30/0269 |

* cited by examiner

| User Profile Fantasy Lineups 1002 | |
|---|---|
| Player | Number of Lineups |
| A | 10 |
| B | 15 |
| C | 13 |
| D | 21 |
| E | 11 |
| F | 17 |
| G | 16 |

FIG. 10

Bet History 1102

| Bet | Parlay/Single | Bet Type | Pre-game/In-game | Bet Amount | Fantasy Sports Lineup |
|---|---|---|---|---|---|
| Bet A | P | T1 | Pre-game | C1 | 1 |
| Bet B | S | T2 | In-game | C2 | 2 |
| Bet C | S | T3 | Both | C3 | 3 |
| Bet D | P | T4 | In-game | C4 | 4 |

FIG. 11

Comparison 1202

| User A | User B | Similarity Score |
|---|---|---|
| Lineup 1 | Lineup 1 | 50% |
| Lineup 2 | Lineup 2 | 30% |
| Lineup 3 | Lineup 3 | 80% |
| Lineup 4 | Lineup 4 | 20% |

FIG. 12

SYSTEM AND METHODS FOR PRIORITIZING CONTENT PACKETS BASED ON A DYNAMICALLY UPDATED LIST OF PROFILE ATTRIBUTES

CROSS-REFERENCE TO RELATED APPLICATIONS

The present application claims the benefit of and priority to U.S. Provisional Application 62/635,988, filed on Feb. 27, 2018. The entire disclosure of which is incorporated herein by reference in its entirety.

BACKGROUND OF THE DISCLOSURE

Content management systems allocate and use a large amount of computing resources to transmit content to a very large number of remote computing devices. Similarly, remote computing devices also allocate and use a large amount of computing resources to receive and display the content received from the content management devices. In the case of mobile devices where memory, processing power and power are all finite resources, the receipt and display of content that is not contextually relevant to a user can adversely affect the device's performance and battery life as well as the overall user experience. As such, content management systems should utilize appropriate resource management policies to reduce the amount of contextually irrelevant content being delivered to the remote computing devices.

BRIEF SUMMARY OF THE DISCLOSURE

Systems and methods of the present solution are directed to the electronic generation of time sensitive content items that are contextually relevant to recipients and delivery to remote computing devices of such recipients.

In some embodiments, a computing system can generate recommendations for content items to be selected or provided for presentation to a device of a user or one or more remote devices based at least in part on a matching score of the respective content item to a profile associated with the device of the user or the one or more remote devices. The content item or contents items can include a variety of different forms or content, data or information personalized based in part on a profile associated with the device of the user or the one or more remote devices. For example, a content management system can identify and extract data corresponding to at least one profile associated with the device of the user or the one or more remote devices. The identified data can include content a user (or group of users) associated with the profile has interacted with previously, provided and/or generated in some way. Thus, the identified data can correspond to content that a user associated with the profile may have a higher interest, curiosity or concern regarding. The content management system can, using the identified data, generate content recommendations for the user associated with the profile. A match score can be generated between the profile and one or more content recommendations. The match score can correspond to or indicate a likelihood that a user associated with profile is likely to interact with the content recommendation. The content management system can prioritize the content recommendations using the match scores and provide one or more of the content recommendations based in part on the match scores. The content items can be positioned within a display of a device of a user or one or more remote devices for presentation to the user of the device or remote devices based in part on the match score.

Thus, the content management system can generate and provide personalized content items. In this manner, the content management system can avoid generating content having a low likelihood to be interacted with or that is of no interest to a particular user of a device. Rather than maintaining a large number of content items, which requires a significant use of resources, the content management system can help to ensure that fewer content items with higher match scores are generated, thus improving the efficiency of the allocation of computer resources. For example, computer resources can be managed by prioritizing which content items to provide to a user of a device and maintain based in part on dynamically changing profile data. It should be appreciated that the present disclosure can be applied to providing recommendations related to any user profile based selections and historical recommendation data of the user profile.

In at least one aspect, a method for providing content items identifying recommendations based on fantasy sports lineups is provided. The method can include identifying, by a server including one or more processors, for a first user profile, at least one active fantasy sports lineup including a list of players included in a fantasy sports contest hosted by the fantasy sports server and one or more previous fantasy sports lineups, the fantasy sports contest associated with a plurality of real sporting events. The method can include generating, by the server, using the at least one active fantasy sports lineup and the one or more previous fantasy sports lineups, for a user, a recommendation profile. The recommendation profile can include a plurality of relevance scores based on the players included in the at least one active fantasy sports lineup and the one or more previous fantasy sports lineups. The method can include identifying, by the server, a plurality of candidate recommendations relating to the plurality of real sporting events associated with the fantasy sports contest. The method can include determining, by the server, for each candidate recommendation of the plurality of candidate recommendations, one or more of the relevance scores indicating a level of relevance between the recommendation profile and the candidate recommendation. The method can include determining, by the server, using the corresponding relevance scores, for each of the plurality of candidate recommendations, a match score indicating a level of relevance between the candidate recommendation and the recommendation profile. The method can include prioritizing, by the server, the plurality of candidate recommendations based on the relevance scores between each candidate recommendation and the recommendation profile. The method can include providing, by the server, to a device associated with the first user profile, a content item identifying a selected candidate recommendation of the plurality of candidate recommendations based on the relevance score between the selected candidate recommendation and the recommendation profile.

In some embodiments, the method can include generating one or more of a player relevance score based on one or more players included in the first user profile, a team relevance score based on one or more players included in the first user profile, and a point category relevance score based on one or more players included in the first user profile. The method can include performing a weighted aggregation using one or more of a player importance weight, a contest importance weight, and a contest recency weight. The method can include performing a weighted aggregation of the relevance scores of the recommendation profile that correspond to the candidate recommendation.

In some embodiments, the method can include identifying one or more user attributes included in the first user profile, the user attributes corresponding to the user associated with the first user profile. The method can include selecting one or more user attributes from the user profile and generating the recommendation profile using players corresponding to the user attributes form the user profile. The players can be included in the at least one active fantasy sports lineup or the one or more previous fantasy sports lineups. The method can include determining one or more relevance scores for the players corresponding to the user attributes and ranking the players corresponding to the user attributes within the recommendation profile based on the one or more relevance scores.

In some embodiments, the method can include determining for each of the plurality of candidate recommendations, the match score using one or more user attributes from the first user profile. The method can include selecting for the first content item two or more candidate recommendations of the plurality of candidate recommendations. The two or more candidate recommendations of the plurality of candidate recommendations can have corresponding match scores greater than a match score threshold. The method can include determining a position within a display of the device associated with the first user profile for the each of the selected two or more candidate recommendations. The position for the each of the selected two or more candidate recommendations can be based on the corresponding match scores for the two or more candidate recommendations. The method can include dynamically modifying the match score for each of the plurality of candidate recommendations responsive to changes to one or more user attributes of the first user profile.

In at least one aspect, a system for providing content items identifying recommendations based on fantasy sports lineups is provided. The system can include a processor and memory storing machine-readable instructions that, when read by the processor, cause the processor to perform processes that include identifying, for a first user profile, at least one active fantasy sports lineup including a list of players included in a fantasy sports contest hosted by the fantasy sports server and one or more previous fantasy sports lineups, the fantasy sports contest associated with a plurality of real sporting events. The instructions can cause the processor to perform processes that include generating, using the at least one active fantasy sports lineup and the one or more previous fantasy sports lineups, for a user, a recommendation profile. The recommendation profile can include a plurality of relevance scores based on the players included in the at least one active fantasy sports lineup and the one or more previous fantasy sports lineups. The instructions can cause the processor to perform processes that include identifying a plurality of candidate recommendations relating to the plurality of real sporting events associated with the fantasy sports contest. The instructions can cause the processor to perform processes that include determining, for each candidate recommendation of the plurality of candidate recommendations, one or more of the relevance scores indicating a level of relevance between the recommendation profile and the candidate recommendation. The instructions can cause the processor to perform processes that include determining, using the corresponding relevance scores, for each of the plurality of candidate recommendations, a match score indicating a level of relevance between the candidate recommendation and the recommendation profile. The instructions can cause the processor to perform processes that include prioritizing the plurality of candidate recommendations based on the relevance scores between each candidate recommendation and the recommendation profile. The instructions can cause the processor to perform processes that include providing, to a device associated with the first user profile, a content item identifying a selected candidate recommendation of the plurality of candidate recommendations based on the relevance score between the selected candidate recommendation and the recommendation profile.

In some embodiments, the instructions can cause the processor to perform processes that include generating one or more of a player relevance score based on one or more players included in the first user profile, a team relevance score based on one or more players included in the first user profile, and a point category relevance score based on one or more players included in the first user profile. The instructions can cause the processor to perform processes that include performing a weighted aggregation using one or more of a player importance weight, a contest importance weight, and a contest recency weight. The instructions can cause the processor to perform processes that include performing a weighted aggregation of the relevance scores of the recommendation profile that correspond to the candidate recommendation. The instructions can cause the processor to perform processes that include identifying one or more user attributes included in the first user profile, the user attributes corresponding to the user associated with the first user profile.

In some embodiments, the instructions can cause the processor to perform processes that include selecting one or more user attributes from the user profile and generating the recommendation profile using players corresponding to the user attributes form the user profile. The players can be included in the at least one active fantasy sports lineup or the one or more previous fantasy sports lineups. The instructions can cause the processor to perform processes that include determining one or more relevance scores for the players corresponding to the user attributes and ranking the players corresponding to the user attributes within the recommendation profile based on the one or more relevance scores.

In some embodiments, the instructions can cause the processor to perform processes that include selecting for the first content item two or more candidate recommendations of the plurality of candidate recommendations. The two or more candidate recommendations of the plurality of candidate recommendations can have corresponding match scores greater than a match score threshold. The instructions can cause the processor to perform processes that include determining a position within a display of the device associated with the first user profile for the each of the selected two or more candidate recommendations. The position for the each of the selected two or more candidate recommendations can be based on the corresponding match scores for the two or more candidate recommendations. The instructions can cause the processor to perform processes that include dynamically modifying the match score for each of the plurality of candidate recommendations responsive to changes to one or more user attributes of the first user profile.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 10 depicts a table showing a user fantasy sports lineup profile for a user in accordance with one embodiment of the present disclosure;

FIG. 11 depicts a table showing a bet history for a user based on a plurality of bets placed using one or more fantasy sports lineups in accordance with one embodiment of the present disclosure; and FIG. 12 depicts a table showing comparison of fantasy sports lineups from different users and a similarity between the fantasy sports lineups in accordance with one embodiment of the present disclosure.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for providing, to a remote device, a content item including a recommendation and an actionable object to act on the recommendation based on a fantasy sports lineup associated with the remote device.

A. Computing and Network Environment

Figure 1A:
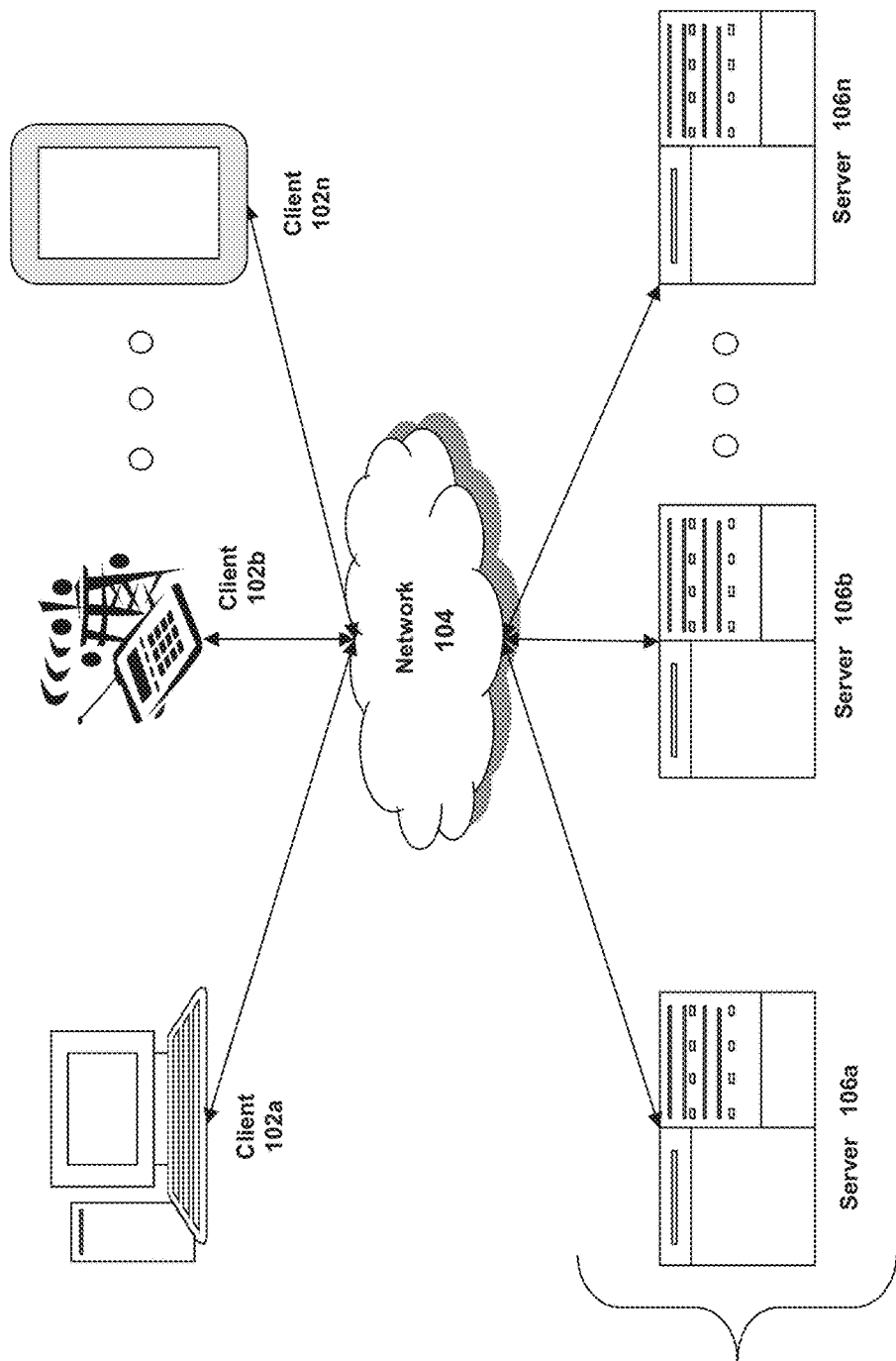
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
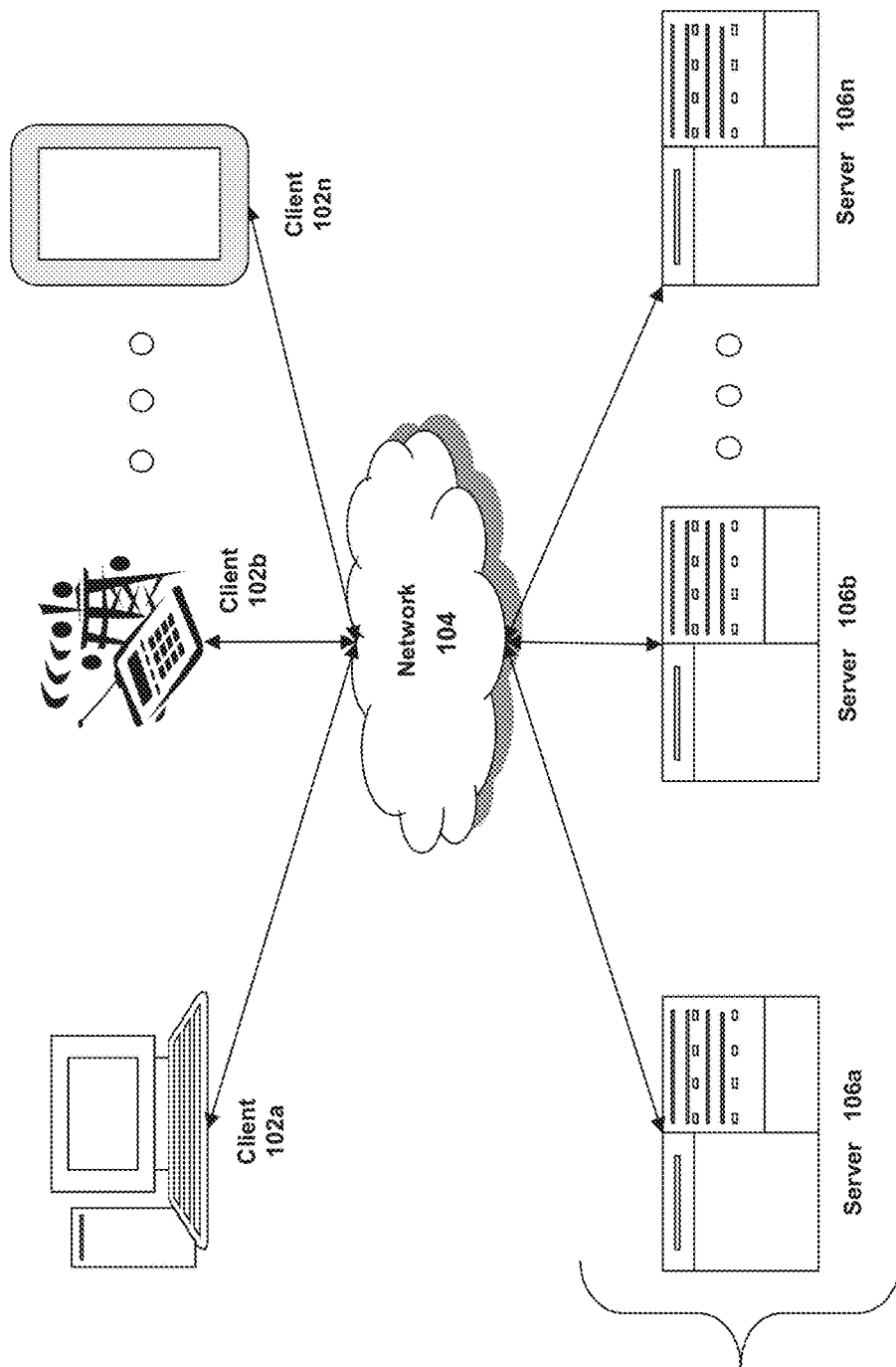
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
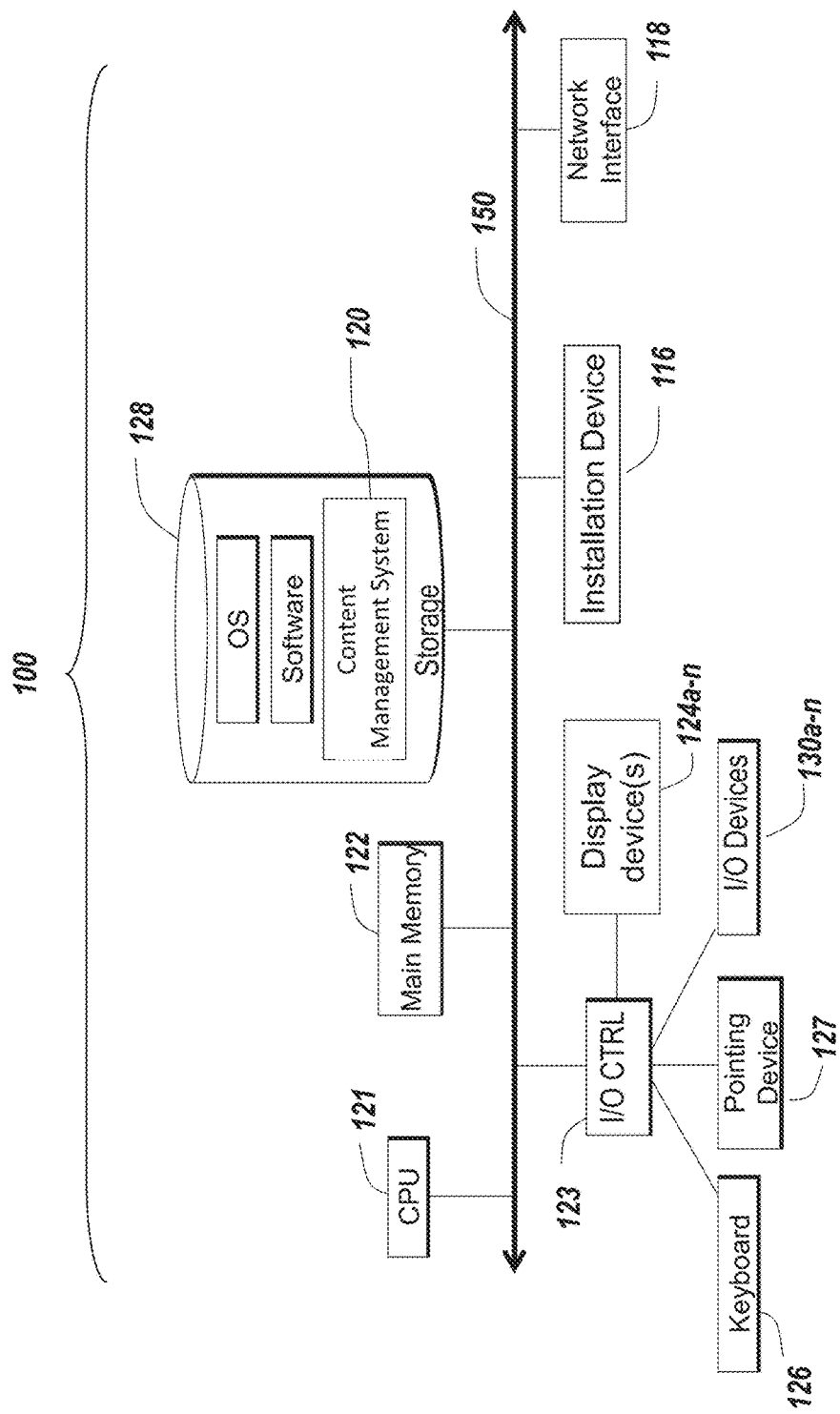
FIGS. 1C and 1D are block diagrams depicting embodiments of computing devices useful in connection with the methods and systems described herein.
Figure 1D:
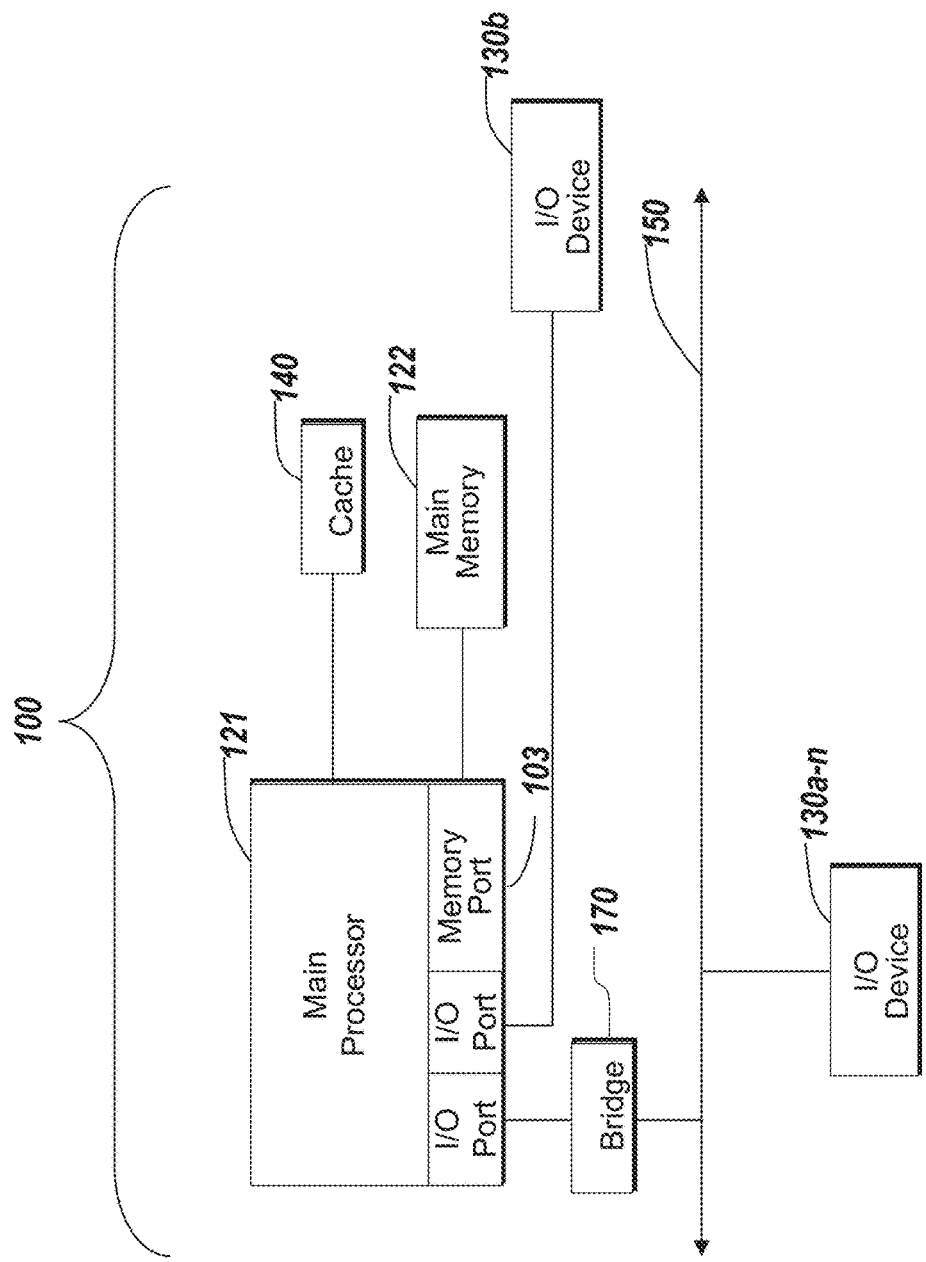

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124*a*-124*n*, a keyboard 126 and a pointing device 127, e.g. a mouse. The storage device 128 may include, without limitation, an operating system, software, and a software of a content management system 120. As shown in FIG. 1D, each computing device 100 may also include additional optional elements, e.g. a memory port 103, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMID PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RANI (nvSRAM), Ferroelectric RANI (FeRAM), Magnetoresistive RAM (MRAM), Phase-change memory (PRAM), conductive-bridging RAM (CBRANI), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WIT, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the content management system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Generating Content Items Including Recommendations and Actionable Objects to Act on the Recommendations As discussed above, systems and methods of the present solution are directed to providing content items identifying recommendations based on fantasy sports lineups. A content management system can provide relevant recommendations to user devices, and can avoid providing irrelevant or unwanted recommendations.

According to one aspect, a method for providing content items identifying recommendations includes identifying, for a user profile, at least one active fantasy sports lineup including a list of players and one or more previous fantasy sports lineups, and generating, for a user, a recommendation profile including a plurality of relevance scores. The method further includes identifying a plurality of candidate recommendations, and determining, for each of the plurality of candidate recommendations, a match score indicating a level of relevance between the candidate recommendation and the recommendation profile. The method further includes prioritizing the plurality of candidate recommendations based on the relevance scores, and providing to a device associated with the user profile, a content item identifying a selected candidate recommendation of the plurality of candidate recommendations based on the relevance score between the selected candidate recommendation and the recommendation profile.

Although the scope of the present disclosure is applicable to any scenario where content items are selected for presentation to remote devices based on a matching of the content items to a profile associated with a respective remote device, at least one implementation of the present disclosure relates to matching content recommendations to a user profile that is based on one or more user attributes of the user profile and historical recommendation data stored associated with the user profile. The user attributes, in some embodiments, include one or more fantasy sports lineups of the user profile and/or fantasy sports contents entered using the user profile. The historical recommendation data can include any data related to content item recommendations associated with the user profile or previously generated for a user associated with the user profile. In some embodiments, the user attributes can include information related to one or more wagers or bets the user has placed, information related to teams or sports the user has shown an interest in, among others. The system described herein can derive an interest of a user via one or more signals or data points that the system can collect from a device of the user, including but not limited to, data the system collects based on the user's usage of an application communicatively coupled to one or more servers of the system, among others. The data points can include content, text strings, or other information the system can extract from information resources, web pages, or articles the user has accessed, an amount of time the user has spent on the information resources, web pages, or articles, images the user has viewed, search queries the user has input, among others. It should be appreciated that the present disclosure can be applied to providing recommendations related to any user profile based selections, user attributes and historical recommendation data of the user profile.

In the context of online gaming, a contest can be an event for which one or more users can register (sometimes referred to herein as registrants). In some embodiments, the contest is a fantasy sports contest. The fantasy sports contest can correspond to one or more "real" contests (e.g. one or more real sporting events). For example, the contest can correspond to one or more real sports games played in a predetermined time period (e.g. on a given Sunday, or throughout a given week), or to a list of predetermined real sports games. The fantasy sports contest corresponding to one or more "real contests," or "real sports games," can refer to the fantasy sports contest corresponding to any game or contest other than the fantasy sports contest itself. This can include any sporting event (e.g. a football event, a soccer event, an e-sports event (e.g. a video game or computer game contest), or another fantasy sports contest). In some fantasy sports contests, each user selects, or is provided, one or more players or teams. A set of players that so correspond to a user can be referred to as the user's "lineup." A contest management system can determine "fantasy points" to award to users based on events that occur in corresponding games. For example, the contest management system can award points to users according to one or more rules for determining points, and can award points based on events that involve a user's players (e.g. can award points based on players of the user's lineup getting points in a real sports event, or based on statistics or achievements of the players of the user's lineup).

Figure 2A:
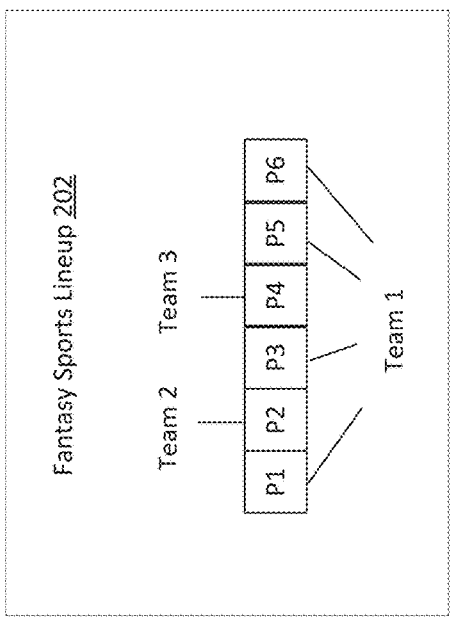
FIG. 2A depicts one or more embodiments of a fantasy sports lineup including a plurality of fantasy sports players.

Referring now to FIG. 2A, FIG. 2A shows a fantasy sports lineup 202. The fantasy sports lineup 202 includes six players: P1 through P6. The six players can respectively correspond to one or more real sports teams. For example, as shown in FIG. 2A, players P1, P3, P5, and P6 can all belong to a real sports team "team 1", P2 can belong to a real sports team "team 2", and P4 can belong to a real sports team "team 4." There is a higher incidence of players corresponding to team 1 than there is of players corresponding to any other team. This can indicate that a manager of the fantasy sports lineup 202 may be interested in team 1, or that team 1 may be more relevant to the manager.

Figure 2B:
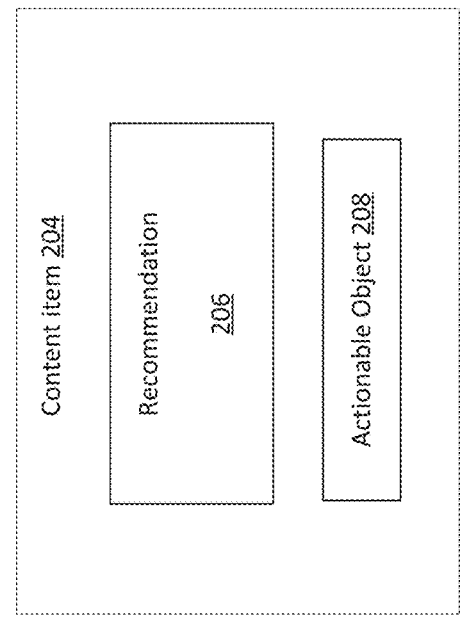
FIG. 2B depicts one or more embodiments of a content item provided to a client device including a recommendation and an actionable object to act on the recommendation.

Referring now to FIG. 2B, FIG. 2B shows a content item 204 that can be provided to a client device associated with a manager of the fantasy sports lineup 202. The content item 204 can include a recommendation 206 and an actionable object 208, which when interacted upon, causes the client device to take an action on the recommendation 206. In some embodiments, the actionable object 208 can be displayed within the recommendation 206. In some embodiments, the recommendation can be selected by the content management system based on one or more fantasy sports lineups 202 of the manager. In some embodiments, the recommendation 206 can correspond to team 1—that is, that corresponds to a team that may be relevant to the manager, based on analysis of the fantasy sports lineup 202. As described above, the methods and systems described herein can provide for analysis of fantasy sports lineups and other fantasy sports information to provide content items to client devices that include recommendations that are relevant to the users of the client devices. For instance, the recommendation may be one that relates to purchasing gear related to team 1 or for purchasing tickets to upcoming games involving team 1. In some embodiments, the recommendation may be generated based on an ongoing or upcoming sporting event involving team 1. For instance, the recommendation can reference an outcome of the ongoing or upcoming sporting event and include a likelihood of a given outcome. In some embodiments, the recommendation can be generated in real-time based on a current score or game condition. In some embodiments, the recommendation can identify a potential outcome within the game. In some embodiments, the recommendation can identify a potential outcome within the game and may be specific to a particular player included in the user's fantasy lineup.

The content item 204 can be displayed on a client device (e.g. a client device associated with the user profile 304), and the content item provider 314 can transmit data for displaying, rendering, or otherwise providing the content item 204 to the client device. The content management system 302 may generate the content item 204 or may request that another system generate the content item 204. The recommendation 206 can include a media item (e.g. any combination of text, image, video, or user-interactive content), and the media item can reference a candidate content management selected by the content management system 302 based on a match score or a ranking of candidate recommendations. For example, the recommendation 206 can include text that recommends the selected content management to the user. The recommendation 206 can also include or be indicative of a prediction on a future outcome corresponding to the content management system. The actionable object 208 can include an object that the user can interact with to facilitate registration in the recommendation 206. For example, the actionable object 208 can include a user-selectable hyperlink that initiates a process to download a webpage, or initiate a process of an application, for registering for the selected recommendation.

Figure 3:
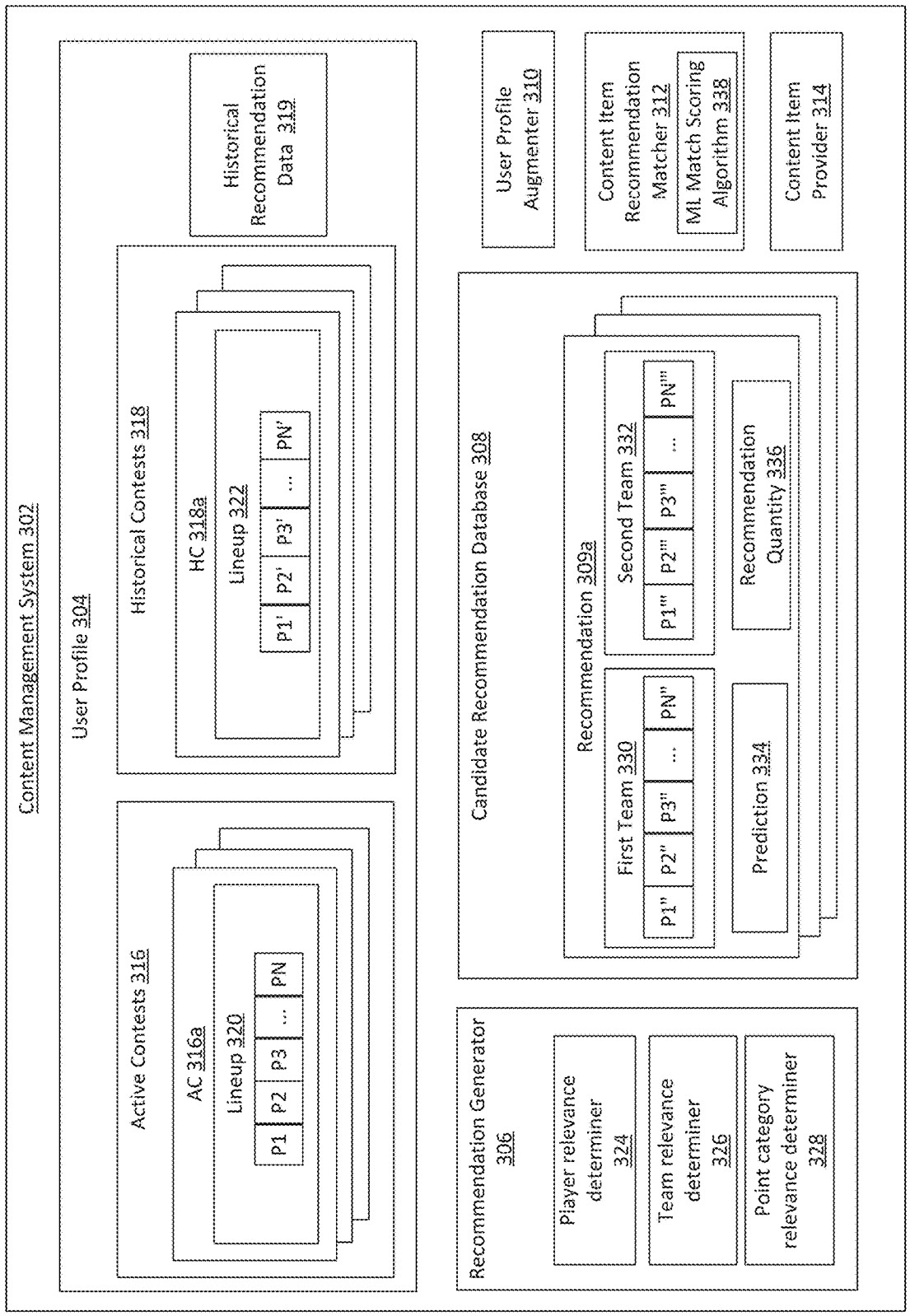
FIG. 3 is a block diagram depicting one or more embodiments of a content management system.

Referring now to FIG. 3, FIG. 3 is a block diagram showing an embodiment of a content management system 302, such as the content management system 120 depicted in FIG. 1C. The content management system 302 can include or be executed on one or more servers, such as the servers 106 shown in FIG. 1A. The content management system 302 can include one or more applications, services, routines, servers, daemons, or other executable logics for providing a content item including a recommendation and an actionable object through which the user can act on the recommendation. For instance, the recommendation can be to purchase gear for a team and the actionable object can be a buy here icon. The user can click or interact with the buy here icon to proceed with purchasing the gear included in the recommendation.

The content management system 302 can include one or more applications, services, routines, servers, daemons, or other executable logics, including one or more of a recommendation generator 306, a profile augmenter 310, a content item recommendation matcher 312, and a content item provider 314. The content management system 302 can also include, access, maintain or manage one or more data structures, including but not limited to a user profile 304 and a candidate content item recommendation database 308.

The user profile 304 can include one or more data structures that store one or more active contests (ACs) 316 for which the user has submitted one or more lineups 320. The active contests can be contests for which registration is open, or contests for which one or more, or all, corresponding real sports events have not begun or have not finished. The ACs 316 can include any number of ACs 316, and can include an AC 316a. The AC 316a can include a lineup 320 including one or more players (e.g. players selected, drafted, or provided to the user of the user profile). In the example depicted in FIG. 3, the AC 316a includes a number N total players, including a first player P1 through an Nth player PN.

The user profile 304 can include one or more data structures that store one or more historical contests (HCs) 318 for which the user had previously submitted one or more lineups 322. The historical contests can be contests for which registration is closed, or contests for which one or more, or all, corresponding real sports events have finished. The HCs 318 can include any number of ACs 316, and can include an HC 318a. The HC 318a can include a lineup 322 including one or more players (e.g. players selected, drafted, or provided to the user of the user profile). In the example depicted in FIG. 3, the HC 318a includes a number N total players, including a first player P1' through an Nth player PN'.

The user profile 304 can include one or more data structures that store historical recommendation data 319. The historical recommendation data 319 can be any data related to content item recommendations associated with the user profile 304 or historical activity corresponding to interactions associated with the user profile 304 and previous content items or content item recommendations. For example, the historical recommendation data 319 can include historical content item recommendations in which the user acted upon. The historical recommendation data 319 can include any of the content item recommendation features discussed below in reference to content item recommendation 309a. In some embodiments, the historical recommendation data 319 can include any of the content item recommendation features discussed below in reference to content item recommendation 309a.

In some embodiments, the historical recommendation data 319 can include augmented user profile data corresponding to historical recommendations associated with other user accounts or other user profiles. For example, as described below, the user profile augmenter 310 can determine user profiles similar to the user profile 304, and can store historical recommendation data associated with the similar user profiles as part of the user profile 304. This augmented user profile can be used (e.g. with corresponding weights, such as weights based on a degree of similarity between the user profile and the corresponding similar user profile) by the content item recommendation matcher 312 to determine a match between a candidate content item recommendation and the user profile 304, as described in more detail herein. For example, the augmented user profile can include more data than the user profile 304, and may thus provide a larger sample size and correspondingly more reliable statistics for use by the content management system 302.

In some embodiments, the recommendation can be based on a future outcome of a real-life event. For instance, the real-life event can be a sporting event for which one or more users have selected fantasy sports lineups. The recommendation can be based on a prediction relating to a performance of a particular player or particular team corresponding to the sporting event. The recommendation may identify or include a feature identifying a quantity and a value representative of a likelihood that certain outcome will occur in the future. The value may be determined on a current status of the sporting event including but not limited to a current performance of one or more players participating in the sporting event.

The recommendation generator 306 can include components, subsystems, modules, scripts, applications, or one or more sets of computer-executable instructions for generating a recommendation profile, and can include a player relevance determiner 324, a team relevance determiner 326, and a point category relevance determiner 328. The recommendation generator 306 can be configured to generate a recommendation profile that includes one or more values for parameters corresponding to features of recommendations that may be relevant to the user profile 304. For example, generally speaking, the recommendation generator 306 may analyze the user profile 304 to determine a relevance score for one or more players, one or more teams, or one or more point categories (e.g. "offense" fantasy points, "defense" fantasy points, "ground-game" fantasy points, "passing" fantasy points, or other point categories, described in more detail herein) with respect to the user profile 304. The recommendation profile can include a set of relevance scores derived from the user profile 304. The recommendation profile can be included in the user profile 304 of a particular user.

Figure 4:
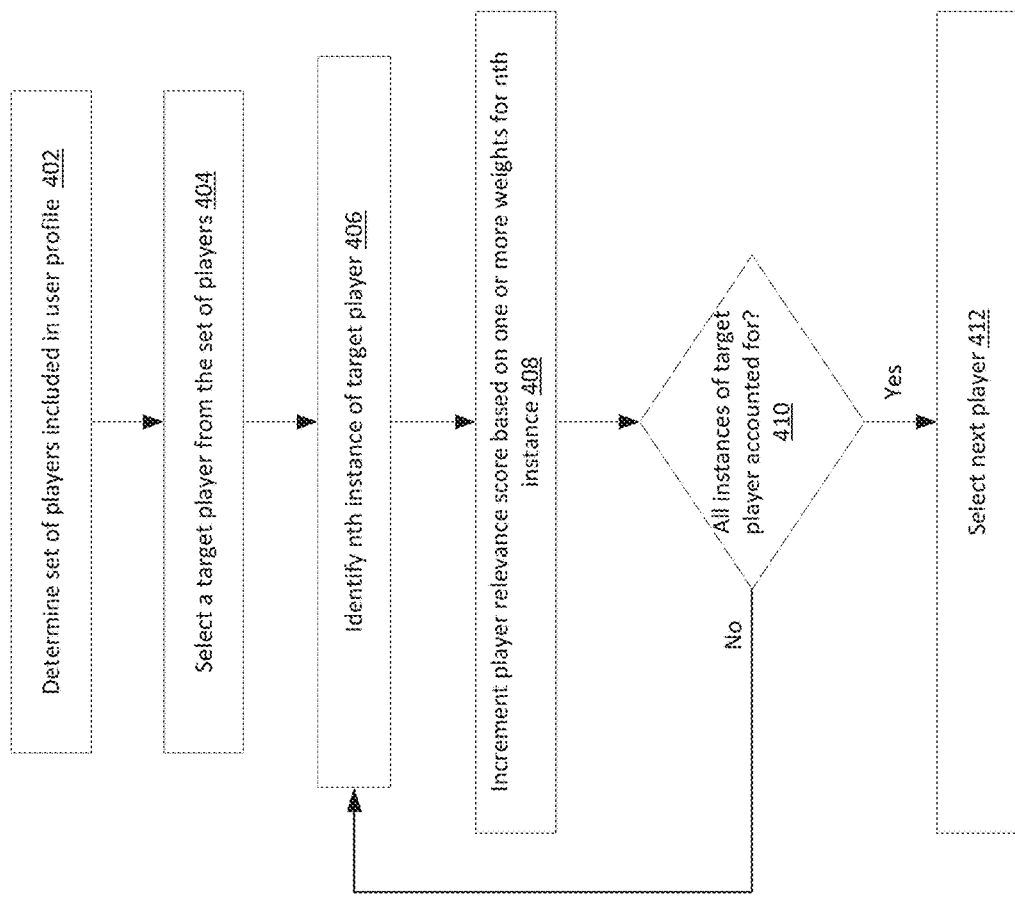
FIG. 4 is a flow chart depicting one or more embodiments of a process for determining a player relevance score for use by the content management system of FIG. 3 to generate recommendations to be included in content items in accordance with one embodiment of the present disclosure.

The player relevance determiner 324 can include components, subsystems, modules, scripts, applications, or one or more sets of computer-executable instructions for determining a player relevance score for a user profile. The player relevance score can be indicative of a relevance of a particular player to the user profile 304 (e.g. can indicate a degree to which a user corresponding to the user profile 304 is interested in the particular player). The player relevance determiner 324 can determine a player relevance score for one or more players included in the user profile 304. For example, the player relevance determiner 324 can determine a player relevance score for each player included in the user profile 304, or for a set of players included in the user profile 304 (e.g. a set including players included in active contests, or a set including players included in active contests and recent historical contests (e.g. contests that began or terminated at or after a predetermined date and/or time)). The player relevance determiner 324 can also determine a player relevance score for players not included in the user profile 304 (e.g. may assign a predetermined or default score to one or more players not included in the user profile 304, which may vary from player to player). An embodiment of a method of using the player relevance determiner 324 to determine one or more player relevance scores is shown in FIG. 4, and is described in more detail below.

The team relevance determiner 326 can include components, subsystems, modules, scripts, applications, or one or more sets of computer-executable instructions for determining a team relevance score for a user profile. The team relevance score can be indicative of a relevance of a particular team (e.g. a sports team of a player, or a sponsor of a player) to the user profile 304 (e.g. can indicate a degree to which a user corresponding to the user profile 304 is interested in the particular team). One or more of the players included in the user profile 304 can be associated with one or more teams (e.g. a real sports team for which the player plays). Such teams may be referred to herein as being "included" in the user profile 304.

Figure 5:
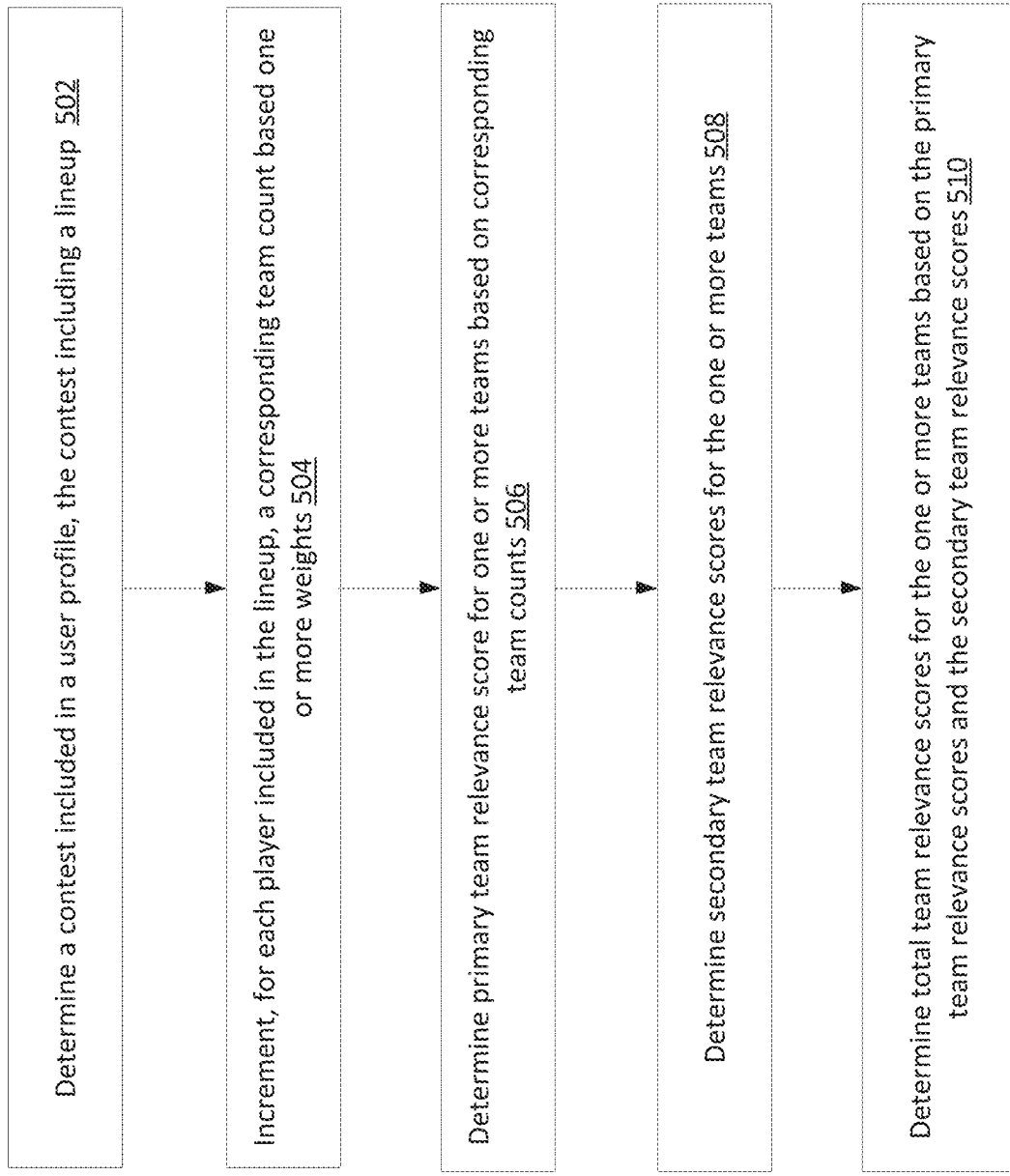
FIG. 5 is a flow chart depicting one or more embodiments of a process for determining a team relevance score for use by the content management system of FIG. 3 to generate recommendations to be included in content items in accordance with one embodiment of the present disclosure.

The team relevance determiner 326 can determine a team relevance score for one or more teams included in the user profile 304. For example, the team relevance determiner 326 can identify one or more user attributes from the user profile 304 to determine the team relevance score for the one or more teams. The user attributes can include, but not limited to, a geographic location of a user associated with the user profile 304, previous geographic locations of a user associated with the user profile 304, one or more social media accounts for a user associated with the user profile 304 and teams or content within the social media accounts identifying one or more teams, one or more teams a user associated with the user profile 304 has purchased tickets and/or merchandise for, and/or one or more teams a user associated with the user profile 304 has had monetary interactions with or regarding (e.g., betting history, fundraisers). Thus, the team relevance determiner 326 can identify one or more teams corresponding to a user profile 304 from a variety of different sources to determine team(s) that a user associated with the user profile 304 is likely to have a high interest in. The team relevance determiner 326 can determine a team relevance score for each team included in the user profile 304, and/or each team corresponding to one or more user attributes of the user profile 304. In some embodiments, the team relevance determiner 326 can determine a team relevance score for a set of teams included in the user profile 304 (e.g. a set including teams included in (associated with players of) active contests, or a set including teams included in active contests and recent historical contests (e.g. contests that began or terminated at or after a predetermined date and/or time)). The team relevance determiner 326 can also determine a team relevance score for teams not included in the user profile 304 (e.g. may assign a predetermined or default score to one or more teams not included in the user profile 304, which may vary from team to team). An embodiment of a method of using the team relevance determiner 326 to determine one or more team relevance scores is shown in FIG. 5, and is described in more detail below.

The point category relevance determiner 328 can include components, subsystems, modules, scripts, applications, or one or more sets of computer-executable instructions for determining a point category relevance score for a user profile. The point category relevance score can be indicative of a relevance of a particular point category to the user profile 304 (e.g. can indicate a degree to which a user corresponding to the user profile 304 is interested in the particular point category). The point category relevance score can be based on one or more players included in the user profile 304 and likely to contribute to point categories. The point category relevance score can be based on a sports role of the player (e.g. a position that the player plays, or is otherwise associated with). The point category relevance score can be associated with a team of the player. Thus, the point category relevance score can indicate a player's likelihood of contributing to a particular point category for a particular team.

Point categories may be predetermined categories. For example, point categories can include "offense" fantasy points, such as fantasy points awarded based on a predefined set of statistics defined as "offense" statistics. Offense statistics can include any statistic, and may include, for example, any of points and/or point types (e.g. total points, touchdowns, field goals, safeties, three-pointers, goals, assists), e-sports statistics (e.g. "kills," assists, kill-to-death ratio (which may also be considered a "defensive" statistic), or achievement of objectives), or other offensive statistics attributed to players participating in real sports events. Another point category may be a "defense" fantasy points, such as fantasy points awarded based on a predefined set of statistics defined as "defense" statistics (e.g. take-aways, blocks, hits, forced fumbles, forced errors, interceptions, +/−(e.g. as a hockey statistic)). Another points category may include "other position" fantasy points, which can include points awarded to players playing a position that may be considered its own category. For example, "other position" fantasy points can include fantasy points awarded to goalies (e.g. for saves, save percentage, goals-against-average, or shutouts), fantasy points awarded to pitchers (e.g. earned run average, strikeouts, wins), or fantasy points awarded to kickers (e.g. field-goals or total points). Some other fantasy point categories can include, for example, "ground game" fantasy points (e.g. rushing yards or touchdowns earned by rushing) or "passing game" fantasy points (e.g. total passing yards or touchdowns earned by passing). The above provides only a few examples of fantasy point categories, and any other fantasy point categories may be defined, as appropriate.

Figure 6:
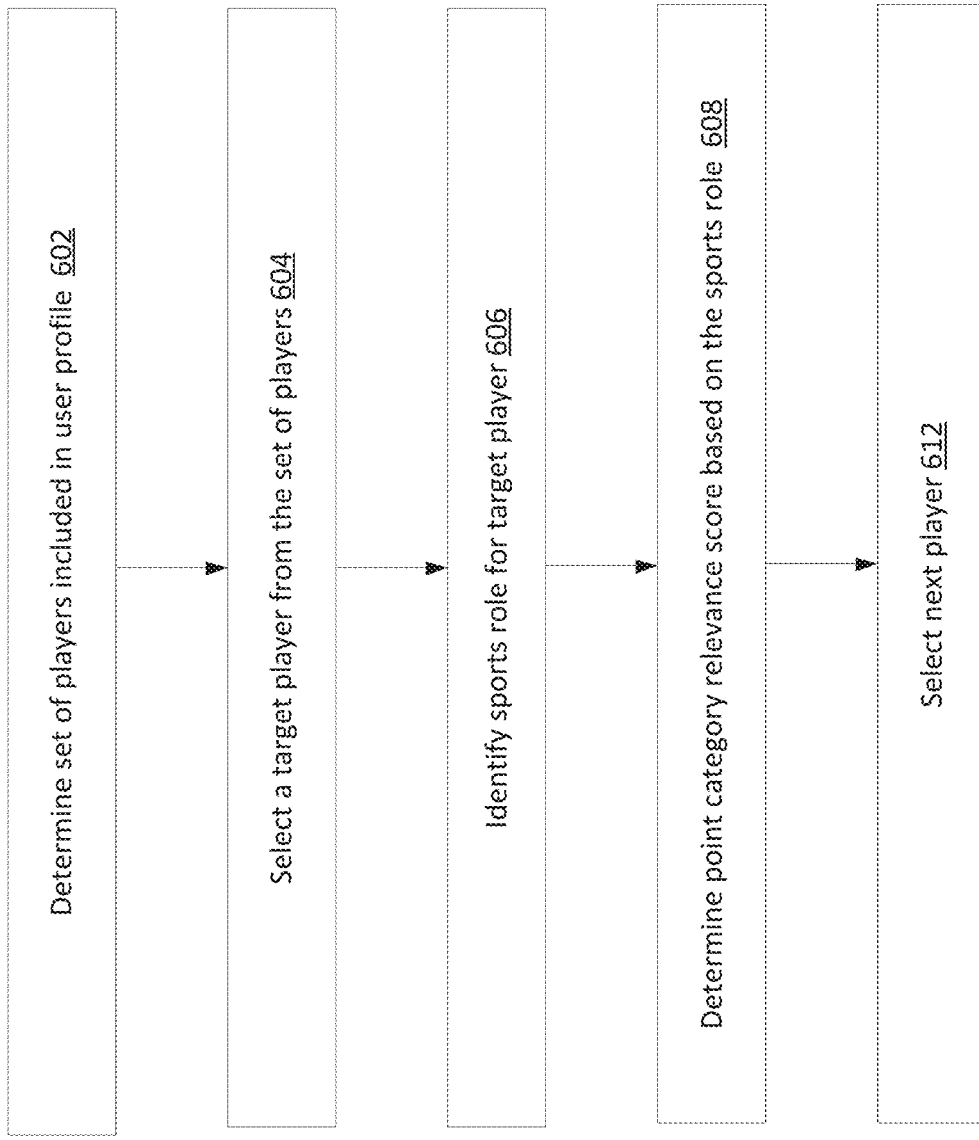
FIG. 6 is a flow chart depicting one or more embodiments of a process for determining a point category relevance score for use by the content management system of FIG. 3 to generate recommendations to be included in content items in accordance with one embodiment of the present disclosure.

The point category relevance determiner 328 can determine a point category relevance score for one or more point categories based on one or more players included in the user profile 304. For example, the point category relevance determiner 328 can determine a point category relevance score for a set of point categories each for each team included in the user profile 304, or for a set of teams included in the user profile 304 (e.g. a set including teams included in (associated with players of) active contests, or a set including teams included in active contests and recent historical contests (e.g. contests that began or terminated at or after a predetermined date and/or time)). The point category relevance scores can thus indicate a likelihood of a player included in the user profile 304 contributing to a particular point category for a particular team. An embodiment of a method of using the point category relevance determiner 328 to determine one or more point category relevance scores is shown in FIG. 6, and is described in more detail below.

The candidate content item recommendation database 308 can include one or more data structures that store recommendations 309, including the recommendation 309a shown in FIG. 3. The recommendations 309 can be content items or content objects that can be presented to a device of the user. The recommendations 309 can include information that the system can use to generate content items that can be transmitted to and presented on a device of the user. The recommendations 309 can include a user interface through which a user can input a recommendation amount and through which the user can interact with the recommendation. In some implementations, the recommendation 309a can include or otherwise identify one or more of: a first team 330, a second team 332, a prediction on a future outcome 334, and a recommendation quantity 336. The recommendation 309a can correspond to a likelihood that a certain outcome will occur in one or more sporting events. The recommendation may be an invitation to participate in predicting a future outcome that is either managed by the content management system 302, or by one or more third party servers in communication with the content management system 302. In some implementations, the recommendation 309a can include or otherwise identify one or more players selected in one or more fantasy sports lineups.

In some embodiments, the content management system 302 can be in communication with one or more third party servers that periodically provide data that the content management system 302 can use to generate one or more recommendations to be included in content items that are then presented to remote devices associated with users. The data provided to the content management system 302 can include a plurality of possible future outcomes for one or more sporting events, including but not limited to future outcomes pertaining to individual players, teams, or multiple teams. In addition, the data can include a current value that is based on a likelihood that a particular future outcome will occur based on a current status of one or more sporting events.

In some such embodiments, the content management system 302 can establish and maintain a communication channel with the one or more third-party servers and utilize a recommendation policy that enables the content management system 302 to access the data maintained by the one or more third-party servers, including the data the content management system can use to generate the one or more recommendations.

In some embodiments, the content management system 302 can be configured to perform one or more functions of the third-party servers, including but not limited to dynamically generating current values that are based on a likelihood that particular future outcomes will occur based on a current status of one or more sporting events.

The content management system 302 can include components, subsystems, modules, scripts, applications, or one or more sets of computer-executable instructions for receiving future outcome data from the one or more third party servers and for processing the future outcome data to generate recommendations, such as the recommendation 309a. By way of example, the processing can include determining a team or a player associated with the future outcome data, and including the team or player in the determined recommendation 309a. The content management system 302 can determine a relevance of the recommendation 309a to the user profile 304 using one or more features of the recommendation 309a, including any of the first team 330, the second team 332, and the prediction on a future outcome 334.

The recommendation 309a can include a first team 330 that includes a set of players P1" through PN", and a second team 332 that includes a set of players P1'" through PN'". The first team 330 can include any number of players, and the second team 332 can include any number of players. In some embodiments, the recommendation 309a relates to a real sports event in which the first team 330 and the second team 332 play against each other. In some embodiments, the recommendation 309a does not include any teams, and the recommendation 309a may include one or more players (e.g. the recommendation 309a may be related to one or more players' performance (e.g. individual performance)).

The prediction on a future outcome 334 can include data related to a particular outcome within the game, for instance, a goal or win condition. For example, the prediction on a future outcome 334 can include data that indicates that the goal or win condition includes a win, or includes a feature of the real sports event being above, equal to, or below a threshold. For example, prediction on a future outcome 334 can include data that indicates that the particular outcome is achieved if one or more players or one or more teams scores a predetermined number of points, or achieves a pre-determined number of instances of an objective (e.g. touchdowns), or if at least a predetermined total number of points is scored in a game (an "over/under" for a game point total), or if another objective is achieved (e.g. a shutout), or some combination of the above.

The prediction on a future outcome 334 can be associated with one or more (fantasy) point categories (e.g. via associations stored in a reference table, or via metadata tags). For example, a prediction on a future outcome 334 that indicates that a particular outcome is achieved if an "over/under" for a game point total can be associated with an "offense" point category and with a "defense" point category. The association may indicate a correlation between the point category and the prediction on a future outcome. For example, the association may indicate a positive correlation between the "offense" point category and the "over/under" prediction on a future outcome, and a negative correlation between the "defense" point category and the "over/under" prediction on a future outcome. The association may include a weight indicative of a strength of the correlation. For example, an "interceptions" point category may have an association with a "win" prediction on a future outcome (a prediction on a future outcome that is determined by a teaming winning a real sports event) that includes a relatively small, positive weight (indicating a relatively small, positive correlation between interceptions and a win), while a "touchdowns" point category may have an association with the "win" prediction on a future outcome that includes a relatively large, positive weight (indicating a relatively large, positive correlation between touchdowns and a win). The weights may be determined in any appropriate manner, including by a machine-learning algorithm trained on a training data set. The term "machine-learning algorithm" can be used herein to refer to an algorithm determined by a process including machine learning (e.g. a machine-trained algorithm). Such associations can be used by the content item recommendation matcher 312 to correlate point category relevance scores for a recommendation profile with candidate recommendations stored in the candidate recommendation database 308, as described in more detail herein.

In some embodiments, the recommendation 309a can include recommendations for live or real-time betting. For example, the recommendation 309a can include or correspond to play-by-play betting. The content management system 302 can generate one or more recommendations 309a for a particular play within a current or live game. For example, the content management system 302 can generate recommendations 309a once a sports contest begins (e.g., is underway, initiates) and can continue providing recommendations 309a during the sports contest. The content management system 302 can generate one or more recommendations 309a for a particular scoring opportunity (e.g., goal, home run, touchdown) within a current or live game. The recommendations 309a can be generated based in part on user attributes and/or data stored in or associated with a user profile 304. The content management system 302 can generate one or more recommendations 309a responsive to different events that may occur during a sports contest. For example, the contest management system 302 can generate a first set of recommendations 309a before or as a sports contest begins. The first set of recommendations 309a can correspond to a first team to score a goal, a first player to hit a home run, or a first player to score a touchdown. After a first scoring event (e.g., goal, home run, touchdown) occurs within the sports content, the content management system 302 can generate a second set of recommendations 309a. The second set of recommendations 309a can be different from the first set of recommendations 309a. In some embodiments, one or more recommendations 309a from the first set of recommendations 309a can be the same as one or more recommendations 309a from the second set of recommendations 309a. After a second scoring event (e.g., field goal, strike out, three point shot) occurs within the sports content, the content management system 302 can generate a third set of recommendations 309a. The third set of recommendations 309a can be different from the first set of recommendations 309a and/or the second set of recommendations 309a. In some embodiments, one or more recommendations 309a from the third set of recommendations 309a can be the same as one or more recommendations 309a from the first set of recommendations 309a and/or the second set of recommendations 309a. The content management system 302 can continually and dynamically generate one or more recommendations 309a during a live sports contest or sports contest that is underway to provide live betting or play-by-playing.

The content management system 302 can continually and dynamically generate one or more recommendations 309a that are personalized for a user associated with the user profile 304 by using user attributes and/or other data stored in and/or associated with the user profile 304. For example, the first set of recommendations 309a can include a large set of recommendations 309a. The content management system 302 can rank and assign weights to each of the recommendations 309a forming the first set of recommendations 309a using a match score. The content management system 302 can generate match scores for each of the recommendations 309a forming the first set of recommendations 309a. The match scores can correspond to a relationship between user attributes and/or data stored in the user profile 304. In embodiments, the match score can indicate a likelihood that a user associated with the user profile 304 is likely to act upon, participate, or engage with the recommendation 309a. The content management system 302 can identify and select a predetermined number of recommendations 309a (e.g., top three, top five, top ten) having the highest or greatest match score as compared to the other recommendations 309a. The content management system 302 can provide or present the predetermined number of recommendations 309a having the highest or greatest match score as compared to the other recommendations 309 to a user of a device associated with the user profile 304 to provide a personalized set of real-time recommendations 309a to the respective user. The content management system 302 can continually and dynamically update and generate one or more personalized recommendations 309a during a live sports contest or sports contest that is underway to provide personalized live betting or personalized play-by-playing for a user of a device associated with the user profile 304.

The recommendation quantity or amount 336 can be a value corresponding to the recommendation. For example, the recommendation amount 336 can indicate an amount to participate in the prediction on a future outcome 334 included in the recommendation (e.g. an amount of money or points), an amount that may be awarded upon successful completion of the prediction on a future outcome 334, or a ratio of the amount to participate in the prediction on a future outcome included in the recommendation and the amount that may be awarded upon the prediction on the future outcome actually occurring. In some embodiments, the recommendation quantity or amount 336 can be a fixed or set amount determined by a user associated with the user profile. In one embodiment, the recommendation quantity or amount 336 can be, for example, a $50 bet on a first team to win or defeat a second, different team. The amount of the recommendation quantity or amount 336 can vary and can be less than this amount or greater than this amount.

In some embodiments, the recommendation 309a can be based on a plurality of predictions on future outcomes. For instance, the recommendation can be based on a first prediction on a future outcome (for instance, a first player of team 1 rushing for more than 100 yards) and a second prediction on a future outcome (for instance, a second team beating a third team by more than 7 points). A user can take an action on such a recommendation and if both predictions actually occur, the user can be rewarded based on the recommendation amount associated with the recommendation.

The user profile augmenter 310 can include components, subsystems, modules, scripts, applications, or one or more sets of computer-executable instructions for augmenting a user profile 304. The augmented user profile can include more data than the user profile 304, and may thus provide a larger sample size and correspondingly more reliable statistics for use by the content management system 302. The user profile augmenter 310 can augment the user profile 304 by categorizing the user profile 304 as belonging to a set of similar user profiles, and the recommendation generator 306 can determine a recommendation profile based on an expanded set of parameter values that corresponds to the set of similar user profiles. For example, the user profile augmenter 310 can implement a clustering algorithm on a set of user profiles to generate clusters of similar user profiles. The user profile 304 may be so-clustered, and may be tagged as belonging to a particular set of similar users. The recommendation generator 306 may determine a recommendation profile for the particular set of similar users. For example, the recommendation generator 306 can perform any of the operations described herein using contests and associated information included in any of the user profiles of the particular set of similar user profiles. The recommendation generator 306 may weigh the user profile 304 more heavily than other user profiles when determining the recommendation profile. This can provide for an augmented user profile that can be used by the recommendation generator 306 to determine similar contests. References made herein to a user profile, or to a user profile 304, may refer to a user profile or to an augmented user profile.

The content item recommendation matcher 312 can include components, subsystems, modules, scripts, applications, or one or more sets of computer-executable instructions for matching a candidate recommendation of the candidate content item recommendation database 308 to a recommendation profile of the user. The content item recommendation matcher 312 can perform analysis based on, for example, a player relevance score of the recommendation profile, a team relevance score of the recommendation profile, a point category relevance score of the recommendation profile, and a real-time event score, and can determine a match with features of a candidate recommendation (e.g. can determine a match score).

The content item recommendation matcher 312 can employ a match scoring algorithm 338 (match algorithm 338) to match the candidate recommendation to the recommendation profile. The match algorithm 338 can, for example, calculate a total match score based on a player match score (corresponding to a match between the player relevance score of the recommendation profile and one or more players that may be relevant to the candidate recommendation), a team match score (corresponding to a match between the team relevance score of the recommendation profile and one or more teams that may be relevant to the candidate recommendation), a point category match score (corresponding to a match between a point category relevance score of the recommendation profile and one or more prediction on a future outcomes that may be relevant to the candidate recommendation), and/or a historical recommendation match score. The matching can include, for example, determining a plurality of player, team, or point match scores using weights determined by a machine-learning process, and determining a total match score based on a weighted aggregation using the weights. Detailed description of an example of a process is described below in reference to FIG. 7.

The content item recommendation matcher 312 can further generate a ranking or a respective priority score for the candidate recommendations based on the determined match scores. The content item recommendation matcher 312 may determine a set of candidate recommendations (e.g. all of the candidate recommendations, or a smaller set of candidate recommendations that satisfy one or more predetermined conditions (such as having a match score above a predetermined threshold)), and the content item recommendation matcher 312 may rank the set of candidate recommendations based on their respective match scores. For example, the content item recommendation matcher 312 may rank the candidate recommendations of the set of candidate recommendations in descending order from highest match score, or may employ any other appropriate ranking policy. In some embodiments, the match score between a recommendation profile and a candidate recommendation indicates a likelihood that a user associated with the user profile 304 is likely to act upon, participate, or engage with the candidate recommendation.

The content item provider 314 can include components, subsystems, modules, scripts, applications, or one or more sets of computer-executable instructions for providing a content item (such as a content item 204, described below in reference to FIG. 2B) to a client device. The content item can include one or more candidate recommendations that have a match score that satisfies a predetermined condition. For example, the content item provider 314 can provide data for displaying or rendering the content item, or can instruct another system to provide such data. The content item can include a reference to (e.g. can include a reference included in a text, an image, a video, a hyperlink, an interactive object for initializing an application, or another media item) the candidate recommendation.

Referring now to FIG. 4, FIG. 4 shows an example embodiment of a process for determining a respective player relevance score for one or more players corresponding to the user profile 304. The process can be performed by the player relevance determiner 324 using data included in the user profile 304. The player relevance scores can be included in a recommendation profile of the user profile 304.

In a brief overview, the player relevance determiner 324 can determine a set of players included in user profile (BLOCK 402). The player relevance determiner 324 can select a target player from the set of players (BLOCK 404). The player relevance determiner 324 can identify an nth instance of target player (BLOCK 406). The player relevance determiner 324 can increment player relevance score based on one or more weights for the nth instance (BLOCK 408). The player relevance determiner 324 can determine whether all instances of the target player accounted for (BLOCK 410). If the player relevance determiner 324 determines that all instances of the target player are not accounted for, the process can proceed to BLOCK 404, and the index n can be increment to select a next instance of the target player. If the player relevance determiner 324 determines that all instances of the target player are accounted for, the process can proceed to BLOCK 412 and a next player can be selected.

In more detail, at BLOCK 402 the player relevance determiner 324 can identify a set of players included in the user profile 304. The players can be from one or more fantasy sports lineups included in the user profile 304. The fantasy sports lineups can be included in one or more active contests 316. The active contests can be contests for which registration is open, or contests for which one or more, or all, corresponding real sports events have not begun or have not finished. The one or more active contests 316 can include a fantasy sports lineup (e.g. a lineup 320) including one or more players (e.g. players selected, drafted, or provided to the user of the user profile) to be included in the set of players. In some embodiments, the content management system 302 can identify only players included in active lineups. In other embodiments, the content management system 302 can identify one or more fantasy sports lineups included in one or more historical contests 318 included in the user profile 302 (e.g. in a manner similar to the identifying of the fantasy lineups from the active contests), and can include players from the identified historical contests 318 in the set of players.

At BLOCK 404 the player relevance determiner 324 can select a target player from the set of players. The target player can be selected for subsequent analysis by the player relevance determiner 324 to generate a player relevance score for the player with respect to the user profile 304.

At BLOCK 406 the player relevance determiner 324 can determine an nth instance of the target player. An "instance" of a player can refer to an instance of a player being included in a fantasy sports lineup included in the user profile 304. In at least some embodiments, each contest (active or historical) that includes the player can constitute an instance of the player. The player relevance determiner 324 can identify a total number N contests that include the player (e.g. can identify N instances of the player), and can proceed to perform analysis on each instance of the player using an index n to track the instance number. At BLOCK 406, the player relevance determiner 324 can select an nth instance of the target player for analysis.

At BLOCK 408 the player relevance determiner 324 can increment a player relevance score for the target player based on one or more weights for the nth instance. The weights for the nth instance can include, for example, weights that are specific to the target player or weights that are specific to the contest corresponding to the nth instance of the target player.

For example, one of the weights may be a "player importance weight." Such a weight may be specific to the target player, and may be retrieved by the player relevance determiner 324 from a lookup table. This can provide for more heavily weighing popular players in generating the player relevance score. In other embodiments, the player importance weight may be specific to the contest corresponding to the instance under analysis. For example, the player importance weight maybe based on (e.g. may be proportional to, or may be equal to) a constrained resource allocated to the player in the contest. For example, a contest may include a salary cap that defines a maximum amount of fantasy money that may be spent on a lineup. Each player may be associated with a "salary cap hit" that counts against the salary cap limit. The salary cap hit of a player may be indicative of the players relative importance in the contest to the user. As such, a player importance weight based on the target player's salary cap hit may be used by the player relevance determiner 324 to weigh the relative importance of an instance of the player.

Another example of a weight to be applied may be a recency weight related to a time of the contest (e.g. a start of registration of the contest, a close of registration of the contest, or any other appropriate time associated with the contest). In embodiments in which historical contests are included, for example, the recency weight may more heavily weigh recent contests, and may less heavily weigh older contests.

Yet another example of a weight that may be applied is a contest importance weight. This may be based on, for example, a total prize pool of the contest or a size of a buy-in for the contest.

The player relevance determiner 324 can thus increment a player relevance score for the target player based on one or more weights for the nth instance. For example, a player relevance score can be incremented by an amount proportion to one or more of the weights (e.g. as part of a running calculation to determine a total player relevance score). The weights may be determined in any appropriate manner, including by a machine-learning algorithm trained on an annotated data set.

At BLOCK 410 the player relevance determiner 324 can determine whether all instances of the target player have been accounted for, or whether a predetermined number of instances of the target player have been accounted for. If more instances of the target plyer remain to be analyzed, the player relevance determiner 324 can increment the index n and can proceed to BLOCK 406. Otherwise, the player relevance determiner 324 can determine that the current player relevance score count is a total player relevance score corresponding to the user profile 304, and can proceed to BLOCK 412 to select a next player for analysis.

Referring now to FIG. 5, FIG. 5 shows an example embodiment of a process for determining a respective team relevance score for one or more teams corresponding to the user profile 304. The process can be performed by the team relevance determiner 326 using data included in the user profile 304. The team relevance scores can be included in a recommendation profile of the user profile 304.

In a brief overview, the team relevance determiner 326 can determine a contest included in a user profile, the contest including a lineup (BLOCK 502). The team relevance determiner 326 can increment, for each player included in the lineup, a corresponding team count based one or more weights (BLOCK 504). The team relevance determiner 326 can determine primary team relevance score for one or more teams based on corresponding team counts (BLOCK 506). The team relevance determiner 326 can determine secondary team relevance scores for the one or more teams (BLOCK 508). The team relevance determiner 326 can determine total team relevance scores for the one or more teams based on the primary team relevance scores and the secondary team relevance scores (BLOCK 510).

In more detail, at BLOCK 502 the team relevance determiner 326 can determine one or more contests included in the user profile 304, the contest including a fantasy lineup including players. In some embodiments, the team relevance determiner 326 can determine players from one or more fantasy sports lineups included active lineups only (e.g. from active contests 316). In other embodiments, the team relevance determiner 326 can determine players from one or more fantasy sports lineups included in one or more historical contests 318 included in the user profile 302.

At BLOCK 504 the team relevance determiner 326 can determine a team count for each team of a set of teams (e.g. each team in one or more real sports leagues). The team relevance determiner 326 can identify each player included in the fantasy lineups of the one or more determined contests, and can increment a corresponding team count for each instance of the players. For each instance of a player, team relevance determiner 326 can increment a corresponding team count (e.g. of a real team for which the player plays). The team relevance determiner 326 can increment the team count based on one or more weights, such as any of the weights discussed above with respect to FIG. 4 (e.g. player importance weights, contest importance weights, or contest recency weights).

At BLOCK 506 the team relevance determiner 326 can determine a primary team relevance score for each team of the set of teams. The primary team relevance score can indicate a relevance of a team to the user profile 304. The primary team relevance score can be based on the team count (e.g. can be equal to or proportional to the team count). In some embodiments, the primary team relevance score is determined based on an algorithm that includes the team count as a feature. The algorithm may include other features, including, for example, a match score corresponding to a match between the team and any of: a geolocation associated with the user profile 304, merchandise purchase data associated with the user profile 304, a "favorite team" associated with the user profile 304 (e.g. selected directly by the user), an internet browsing history associated with the user profile 304, a sports research history indicating which players were researched by the user (e.g. were included on a webpage downloaded by the user, the webpage displaying statistics or other information for the player), and which teams correspond to those player researched player. The team relevance determiner 326 can thus determine a primary team relevance score.

At BLOCK 508 the team relevance determiner 326 can determine a secondary team relevance score. The secondary team relevance score may be indicative of secondary teams that are relevant to the user profile 304 based on a relationship between the secondary team and another team having a high primary team relevance score (e.g. a relevance score above a threshold). The secondary team relevance score may be indicative that the secondary team is a rival team of the other team having a high primary team relevance score (referred to herein as a "primary team"), or that the secondary team is competing with the primary team in some way (e.g. for a playoff spot). The secondary team relevance score can be based on one or more features including, for example, a match score between respective divisions of the primary team and the secondary team, a match score between respective conferences of the primary team and the secondary team, a "rivalry" score referenced in a lookup table, a difference in a total number of real league points between primary team and the secondary team, or any other appropriate factor that may indicate relevance to the primary team.

At BLOCK 510 the team relevance determiner 326 can determine a total team relevance score for the one or more teams based on the primary team relevance score and the secondary team relevance score. In some embodiments, the team relevance determiner 326 can determine the total team relevance score based on a weighted aggregation of the primary team relevance score and the secondary team relevance score. In some embodiments, the team relevance determiner 326 does not implement any secondary team relevance score, and the total team relevance score is simply the primary team relevance score.

Thus, the team relevance determiner 326 can determine a total team relevance score for the user profile 304 for each team of the set of teams (e.g. for each team in one or more sports leagues).

Referring now to FIG. 6, FIG. 6 shows an example embodiment of a process for determining a respective point category relevance score for one or more point categories for a recommendation profile of user profile 304. The process can be performed by the point category relevance determiner 328 using data included in the user profile 304. The point category relevance scores can be included in a recommendation profile of the user profile 304.

In a brief overview, the point category relevance determiner 328 can determine a set of players included in user profile 304 (BLOCK 602). The point category relevance determiner 328 can select a target player from the set of players (BLOCK 604). The point category relevance determiner 328 can identify a sports role for the target player (BLOCK 606). The point category relevance determiner 328 can determine a point category relevance score based on the sports role (BLOCK 608). The point category relevance determiner 328 can select a next player (BLOCK 610).

In more detail, at BLOCK 602 the point category relevance determiner 328 can determine a set of players included in a user profile. The point category relevance determiner 328 can determine one or more contests included in the user profile 304, the contest including a fantasy lineup including players, can each of the players can be included in the set of players. In some embodiments, the point category relevance determiner 328 can determine only players from one or more fantasy sports lineups included in active lineups only (e.g. from active contests 316). In other embodiments, the point category relevance determiner 328 can determine players from one or more fantasy sports lineups included in one or more historical contests 318 included in the user profile 302.

At BLOCK 604 the point category relevance determiner 328 can select a target player from the set of players. The target player can be selected for subsequent analysis by the point category relevance determiner 328 to generate a point category relevance score for one or more point categories with respect to the user profile 304.

At BLOCK 606 the point category relevance determiner 328 can identify a sports role for the target player. The sports role may refer to a real sports position or role for the target player (e.g. short-stop, pitcher, goalie, offensive linesman, or a "support" role (for e-sports)). The target player may be associated with one or more sports roles. For example, the target player may have fantasy eligibility for one or more roles. In such a case, the analysis described herein can be performed for one, more, or all of the target players roles.

At BLOCK 608 the point category relevance determiner 328 can determine or increment a point category relevance score or a point category based on the sports role. The point category relevance determiner 328 can determine or increment one or more a point category relevance scores respectively corresponding to one or more point categories by referencing a lookup table that indicates point category relevance scores corresponding to the target player's role. For example, a target player playing hockey in the National Hockey League (NHL) having a "defenseman" role may have a low corresponding relevance to an "offense" category, and a high corresponding relevance to a "defense" category. The point category relevance determiner 328 can determine or increment respective scores for both the "offense" category and the "defense" category. In some embodiments, the point category relevance determiner 328 can determine or increment based on weights, such as any of the weights discussed above with respect to FIG. 4 and FIG. 5 (e.g. player importance weights, contest importance weights, or contest recency weights).

In some embodiments, additional (e.g. secondary) role information may be associated with the role. For example, the NHL target player's role may be associated with an indication that the defenseman is used in power plays in the NHL. The point category relevance determiner 328 may then more specifically reference a lookup table to determine point category relevance scores corresponding to a "defenseman" with a "power play" tag, which may be associated with a higher score for the "offense" category than a player without the "power play" tag. Alternatively, the "power play" may be an additional role for the target player, and the point category relevance determiner 328 may perform independent analysis (including referencing the lookup table) for both the "defenseman" role and the "power play" to determine point category relevance scores.

At BLOCK 610 the point category relevance determiner 328 can select a next player. Thus the point category relevance determiner 328 can determine contributions to point category relevance scores for a plurality of point categories, based on players included in the user profile 304. The point category relevance scores may be matched with prediction on a future outcomes of candidate recommendations by the content item recommendation matcher 312 to help determine a relevance of the candidate recommendations to the user profile 304, as described herein.

Figure 7:
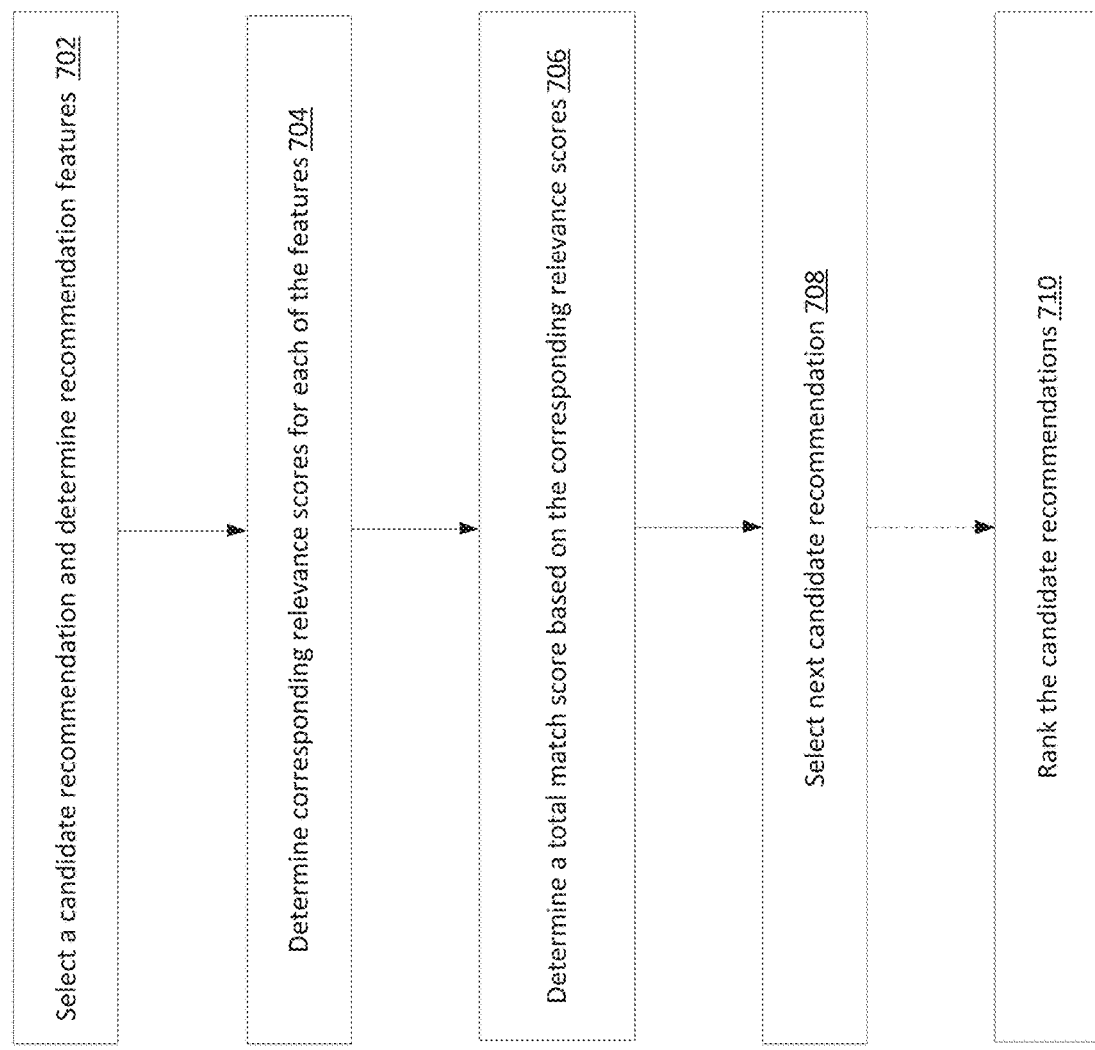
FIG. 7 is a flow chart depicting one or more embodiments of a process for determining a total match score for a candidate recommendation for use by the content management system of FIG. 3 in accordance with one embodiment of the present disclosure.

Referring now to FIG. 7, FIG. 7 shows an example embodiment of a process for determining a total match score between a candidate recommendation and the user profile 304. This process can be performed by the content item recommendation matcher 312. In a brief overview, the content item recommendation matcher 312 can select a candidate recommendation and determine recommendation features (BLOCK 702). The content item recommendation matcher 312 can determine corresponding relevance scores for each of the features (BLOCK 704). The content item recommendation matcher 312 can determine a total match score using a machine-learning algorithm based on the corresponding relevance scores (BLOCK 706). The content item recommendation matcher 312 can select a next candidate recommendation (BLOCK 708). The content item recommendation matcher 312 can rank candidate recommendations (BLOCK 710).

In more detail, at BLOCK 702 the content item recommendation matcher 312 can select a candidate recommendation and can determine one or more recommendation features. The content item recommendation matcher 312 can select a candidate recommendation 309a from the candidate recommendation database 308. The recommendation 309a can include one or more of: one or more athletes, a first team 330, a second team 332, a prediction on a future outcome 334 or recommendation quantity 336. The recommendation 309a can include the first team 330 that includes a set of players P1" through PN", and the second team 332 that includes a set of players P1'" through PN'". The first team 330 can include any number of players, and the second team 332 can include any number of players. In some embodiments, the recommendation 309a includes players but not teams (e.g. for an individual performance outcome). The content item recommendation matcher 312 can determine or identify any of these players. The recommendation 309a can be provided (e.g. registration for the recommendation may be provided) by the content management system 302, or by one or more third party servers. The recommendation 309a can include the prediction on a future outcome 334, which can be associated with one or more points categories. The association may be a weighted association indicating a relevance of the point category to the prediction on a future outcome.

At BLOCK 704 the content item recommendation matcher 312 can determine corresponding relevance scores for each of the features of the recommendation 309a. The corresponding relevance scores can be scores determined, identified or retrieved by the recommendation generator 306, and can be included in a recommendation profile of the user profile 304. The corresponding relevance scores can include, for example, corresponding player relevance scores for one, more than one, or each of the players included in the recommendation 309a, corresponding team relevance scores for one, more than one, or each of the teams included in the recommendation 309a, and corresponding point category relevance scores for one, more than one, or each of the point categories associated with the prediction on a future outcome 334 included in the recommendation 309a.

At BLOCK 706 the content item recommendation matcher 312 can determine a total match score between the candidate recommendation and the user profile 304 using a match scoring algorithm 338 based on the corresponding relevance scores. The match scoring algorithm 338 can be, for example, define a weighted aggregation of the corresponding relevance scores. The weights of the match scoring algorithm 338 can be determined by training the algorithm on an annotated data set. For example, the annotated data set may include a plurality of data sets each including a recommendation profile and candidate recommendation features, and an annotation indicating a "true" total match score. In some such embodiments, the match scoring algorithm 338 can be trained on the annotated data set to determine appropriate weights for the weighted aggregation of the corresponding relevancy scores.

In some embodiments, the recommendation matcher 312 can determine a total match score between the candidate recommendation and the user profile 304 using the match scoring algorithm 338 further based on a historical recommendation match score. A historical recommendation match score can be based on a match between features included in the historical recommendation data 319 of the user profile 304 and features of the candidate recommendation. For example, the recommendation matcher 312 can determine historical recommendation match points for a historical recommendation match score based on a match between any of a team, a prediction on a future outcome, and a recommendation amount. For example, the recommendation matcher 312 can determine historical data match points for a recommendation amount based on a difference between a recommendation amount (or quantity 336) of the candidate recommendation and a recommendation amount derived from one or more historical recommendations of the user profile 304. In some embodiments, the recommendation matcher 312 can determine historical data match points for a team according to a policy or set of rules. For example, the rules can include assigning a first number of points for a direct match between teams, and a second number of points for an indirect match between teams (e.g. based on a determination that two teams being analyzed are rivals (e.g. according to a "rivals" lookup table) or are in a same division). Weights can be used to aggregate the historical recommendation match points to determine the historical recommendation match score.

In some embodiments, the recommendation matcher 312 can determine a total match score between the candidate recommendation and the user profile 304 using the match scoring algorithm 338 further based on a real-time event score based on a real-time event that occurs in, or is otherwise associated with, a game or event corresponding to the candidate recommendation. An example embodiment of a process that determines a total match score in this manner is described in more detail herein in reference to FIG. 9.

At BLOCK 708 the content item recommendation matcher 312 can select a next candidate recommendation from the candidate recommendation database 308. The content item recommendation matcher 312 can perform the analysis described in BLOCKS 702 through 708 for the next candidate recommendation. Thus, the content item recommendation matcher 312 can analyze a set of candidate recommendations to determine a match score for each, corresponding to the user profile 304.

At BLOCK 710 the content item recommendation matcher 312 can rank candidate recommendations. For example, the content item recommendation matcher 312 may rank the candidate contests of the set of candidate contests in descending order from highest match score, or may employ any other appropriate ranking policy. In some embodiments, the match score between a recommendation profile and a candidate contest indicates a likelihood that a user associated with the user profile 304 is likely to register for or take an action on the candidate recommendation.

Figure 8:
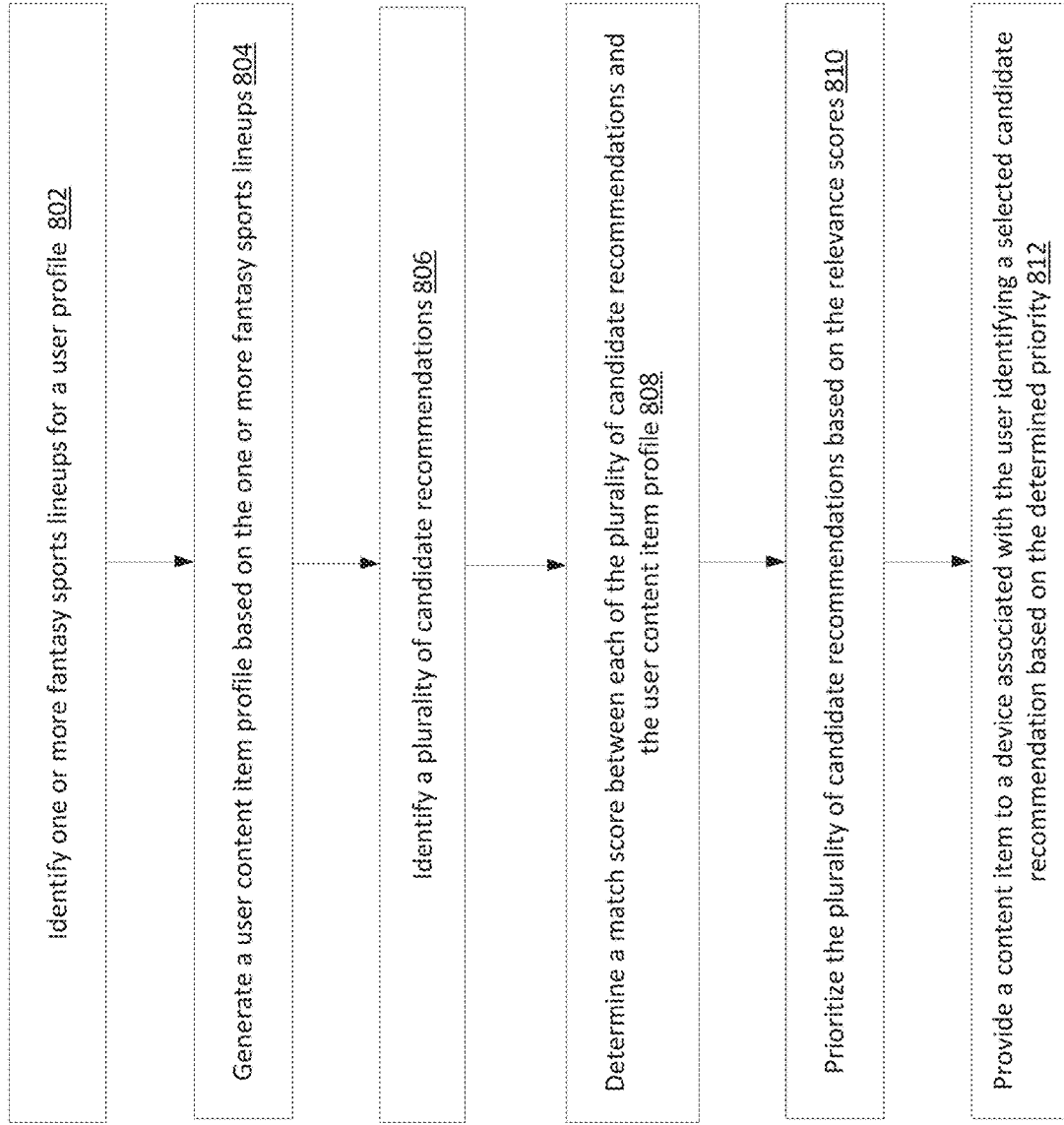
FIG. 8 is a flow chart depicting one or more embodiments of a process for providing a content item to a client device in accordance with one embodiment of the present disclosure.

Referring now to FIG. 8, FIG. 8 shows an example embodiment of a process for providing a content item to a client device identifying a candidate recommendation selected by the content management system 302. This can be used to provide a content item including a reference to a recommendation that is highly ranked based on a high match score between the recommendation and a recommendation profile associated with the client device. The process can be performed by the content management system 302.

In a brief overview, the content management system 302 can identify one or more fantasy sports lineups for a user profile (BLOCK 802). The content management system 302 can generate a recommendation profile based on the one or more fantasy sports lineups (BLOCK 804). The content management system 302 can identify a plurality of recommendations (BLOCK 806). The content management system 302 can determine, using a machine-learning algorithm, a relevance score between each of the plurality of candidate recommendations and the recommendation profile (BLOCK 808). The content management system 302 can prioritize or rank the plurality of candidate recommendations based on the relevance scores (BLOCK 810). And the content management system 302 can provide a content item to a client device associated with the user identifying a selected candidate recommendation based on the determined priority (BLOCK 812).

In more detail, at BLOCK 802, the content management system 302 can identify one or more fantasy sports lineups included in the user profile 304. The fantasy sports lineups can be included in one or more active contests 316. The active contests can be contests for which registration is open, or contests for which one or more, or all, corresponding real sports events have not begun or have not finished. The one or more active contests 316 can include a fantasy sports lineup (e.g. a lineup 320) including one or more players (e.g. players selected, drafted, or provided to the user of the user profile). In some embodiments, the content management system 302 can identify only players included in active lineups. In other embodiments, the content management system 302 can identify one or more fantasy sports lineups included in one or more historical contests 318 included in the user profile 302 (e.g. in a manner similar to the identifying of the fantasy lineups from the active contests). In some embodiments, the above-described analysis is performed with respect to an augmented user profile 304 augmented by the profile augmenter 310.

In some embodiments, the content management system 302 can identify one or more user attributes included in the user profile 304. The user attributes can correspond to a user or group of users associated with the user profile 304. The user attributes can include, but not limited to, a history of past contests, a plurality of lineups (e.g., previous lineups), a user type, a location, an activity profile and price parameters. In some embodiments, the user profile 304 can include one or more lineups (e.g., player lineups) and the lineups can include player attributes, such as but not limited to one or more of the following: a name, a sport category, a location, a team value, a position value, a price parameter or one or more future contests specific to the respective player. In some embodiments, the activity profile may indicate an experience level of the user profile.

At BLOCK 804, the recommendation generator 306 of the content management system 302 can generate a recommendation profile (e.g., recommendation profile) based on the one or more fantasy sports lineups. The player relevance determiner 324 can determine one or more player relevance scores for the players included in the user profile 304 using, for example, the process shown in FIG. 4. The team relevance determiner 326 can determine one or more team relevance scores for teams associated with the players included in the user profile 304 using, for example, the process shown in FIG. 5. The point category relevance determiner 324 can determine one or more point category relevance scores for the players included in the user profile 304 using, for example, the process shown in FIG. 6. These relevance scores can constitute a recommendation profile that is included in, or associated with, the user profile 304.

In some embodiments, the recommendation generator 306 of the content management system 302 can generate a recommendation profile based on the one or more fantasy sports lineups and one or more user attributes from the user profile 304. The recommendation generator 306 can determine one or more player relevance scores based on a user attribute from the user profile 304 or multiple user attributes from the user profile 304. For example, and in some embodiments, the recommendation generator 306 can select two user attributes such as a location of the user and a sport category. The recommendation generator 306 can use the selected user attributes to identify players included in fantasy sports lineups from the user profile 304. The recommendation generator 305 can identify players corresponding to the selected user attributes or having the selected user attributes (e.g., play for a team in the same city or location, participate in the same sport). The recommendation generator 306 can extract the identified players and determine one or more player relevance scores for the identified players having attributes corresponding to the selected user attributes. The recommendation generator 306 can determine one or more player relevance scores for the identified players having attributes corresponding to the selected user attributes using, for example, the process shown in FIG. 4. In embodiments, the recommendation generator 306 can generate the recommendation profile using players corresponding to the user attributes from the user profile 304. For example, the recommendation generator 306 can include in the recommendation profile players having the same attributes as the user attributes from the user profile 304. The players can be from a same team as a favorite team or local team to a user of a device associated with the user profile 304. The players can participate in a favorite sport as a favorite sport identified in the user profile 304. The players can play one or more positions corresponding to one or more positions identified in the user profile 304. The players can be included in the at least one active fantasy sports lineup and/or one or more previous fantasy sports lineups. Thus, the recommendation generator 306 can generate personalized player relevance scores using one or more user attributes that can be personalized for the user or groups of users associated with the user profile 304. The player relevance scores can be personalized as they take into account data and/or user attributes from the user profile 304. The player relevance scores can be unique for each user profile 304 such that player relevance scores generated for a first user profile 304 can be different as compared to player relevance scores generated for a second user profile 304. The number of user attributes used to generate the player relevance scores can vary.

The recommendation generator 306 can use the identified players and the determined one or more player relevance scores to generate the recommendation profile. For example, the recommendation generator 306 can include in the recommendation profile players having the highest player relevance scores and one or more common or the same attributes as the user attributes from the user profile 304. For example, the recommendation generator 306 can include in the recommendation profile a predetermined number of players (e.g., five, ten) having the highest player relevance scores as compared to the other identified players. The number of players included in the recommendation profile can vary and can be selected based in part on a sport category or type of sport. In some embodiments, the recommendation generator 306 can rank the players corresponding to the user attributes within the recommendation profile based on the one or more relevance scores. In embodiments, the identified players can be ranked or ordered within the recommendation profile based in part on a corresponding player relevance score. The identified players having the highest or greatest relevance score can be positioned and/or displayed with a greater prominence to increase a likelihood that a user associated with the user profile 304 is likely to act upon or select the respective player compared to the other identified players. For example, a first player having a highest or greatest player relevance score can be listed first or more prominently within a fantasy sports lineup of the recommendation profile. A second player having a second highest or second greatest player relevance score can be listed second or less prominently within the recommendation profile as compared to the first player. A third player having a lowest or least player relevance score can be listed last or less prominently within the recommendation profile as compared to the first player or the third player. A fantasy sports lineup in a recommendation profile can include a single player or multiple players (e.g., two or more players).

At BLOCK 806, the content management system 302 can identify a plurality of candidate recommendations. The candidate recommendations may be included in the candidate recommendation database 308. The candidate recommendations included in the candidate recommendation database 308 may include or have one or more features, including, for example, one or more players, one or more teams, and one or more predictions on future outcomes. In some embodiments, the content item recommendation matcher 312 can generate a plurality of candidate recommendations. For example, the content item recommendation matcher 312 can identify user attributes from the user profile 304, one or more players and/or one or more teams identified in the user profile 304. The content item recommendation matcher 312 can generate one or more candidate recommendations using the user attributes, one or more players and/or one or more teams from the user profile 304. For example, in one embodiment, the content item recommendation matcher 312 can identify a location of a user of a device associated with the user profile 304 and select one or more players from a team corresponding the identified location. The content item recommendation matcher 312 can use the selected one or more players to generate one or more candidate recommendations. The content item recommendation matcher 312 can determine corresponding relevance scores for each of the features of each of the candidate recommendations. The features can correspond to properties of the respective candidate recommendations. The content item recommendation matcher 312 can identify or extract features such as, but not limited to, a team, a location (e.g., city, state, region), and/or sport type. The features can be selected based in part on data or user attributes from the user profile 304. For example, the content item recommendation matcher 312 can identify features for the candidate recommendations that correspond to data or user attributes of the user profile 304. In some embodiments, the content item recommendation matcher 312 can identify or extract the features from the candidate recommendations that appear the most frequently and/or are included within each of the candidate recommendations.

The corresponding relevance scores can be scores determined, identified or retrieved by the recommendation generator 306, and can be included in a recommendation profile of the user profile 304. The corresponding relevance scores can include, for example, corresponding player relevance scores for one, more, or each of the players included in the respective candidate recommendations, corresponding team relevance scores for one, more, or each of the teams included in the respective candidate recommendations, and corresponding point category relevance scores for one, more, or each of the point categories associated with a prediction on a future outcome included in the respective candidate recommendations.

At BLOCK 808, the content item recommendation matcher 312 can determine, using a machine-learning algorithm, a respective match score between each of the plurality of candidate recommendations and the recommendation profile. For example, the content item recommendation matcher 312 can implement a match scoring algorithm 338 to perform a weighted aggregation of the corresponding relevance scores of the recommendation profile. In embodiments, the match scoring algorithm 338 can include user attributes of the user profile 304, the plurality of candidate recommendations and the recommendation profile as inputs. The match scoring algorithm 338 can be, for example, define a weighted aggregation of the relevance scores corresponding to the respective candidate recommendations and/or one or more selected user attributes. The content item recommendation matcher 312 can provide as inputs to the match scoring algorithm 338 one or more candidate recommendations and one or more selected user attributes from the user profile 304. The content item recommendation matcher 312 can execute the match scoring algorithm 338 to determine one or more match scores (e.g., weighted match scores) between each of the plurality of candidate recommendations and the recommendation profile based in part on the selected user attributes from the user profile 304. The weights of the match scoring algorithm 338 can be determined by training the algorithm on an annotated data set. For example, the annotated data set may include a plurality of data sets each including a recommendation profile and candidate recommendation features, and an annotation indicating a "true" total match score. The match scoring algorithm 338 can be trained on the annotated data set to determine appropriate weights for the weighted aggregation of the corresponding relevancy scores. In some embodiments, the match scores can be ranked based in part on the weights determined for the respective match score. For example, the content item recommendation matcher 312 can determine which candidate recommendations are a better match (e.g., higher weighted match score) for the recommendation profile based in part on the weighted score. In some embodiments, the match scoring algorithm 338 can include a feedback portion to provide current, existing or recent match scores as an additional input to a subsequent execution the match scoring algorithm 338. For example, the match scoring algorithm 338 can dynamically update (e.g., change, increase, decrease) match scores as user attributes within the user profile 304 change 304 and/or as the user profile 304 interacts with or enters different fantasy sports contests.

At BLOCK 810, the content item recommendation matcher 312 can prioritize or rank the plurality of candidate recommendations. The content item recommendation matcher 312 can generate a ranking or a respective priority score for the candidate recommendations based on the determined match scores. In embodiments, the content item recommendation matcher 312 can use the weights of the match scores to rank or order the candidate recommendations. For example, the content item recommendation matcher 312 may rank the candidate contests of the set of candidate contests in descending order from highest match score, or may employ any other appropriate ranking policy. The content item recommendation matcher 312 can rank the candidate contests of the set of candidate contests in descending order from highest weighted match score to lowest weight match score. In some embodiments, the match score between a recommendation profile and a candidate contest indicates a likelihood that a user associated with the user profile 304 is likely to register for or act upon the candidate recommendation. For example, the match score can be weighted using or based in part on user attributes form the user profile 304. The match scores or weighted match scores can correlate attributes of the user or group of users with the candidate recommendations. Thus, the match scores or weighted match scores can be personalized for the user or group of users associated with the user profile 304 by prioritizing candidate recommendations having a degree of similarity with fantasy sports contests, players, teams, and/or real sporting events the user profile 304 has previously interacted with.

At BLOCK 812, the content management system 302 can provide a content item to a device associated with the user identifying a selected candidate recommendation based on the determined priority. For example, the content management system 302 can transmit data for displaying, rendering, or otherwise providing the content item to a client device associated with the user profile. The content item can include at least one selected candidate recommendation of the plurality of candidate recommendations. In some embodiments, the content item can include multiple (e.g., two or more) candidate recommendations of the plurality of candidate recommendations. The content item can include the candidate recommendation having the highest or greatest match score as compared to the other candidate recommendations of the plurality of candidate recommendations. The content item can include a predetermined number of candidate recommendations (e.g., top three candidate recommendations, top five recommendations) having the highest or greatest match score as compared to the other remaining candidate recommendations of the plurality of candidate recommendations. In some embodiments, the content item can include the candidate recommendation having a match score that is greater than or above a match score threshold. The match score threshold can indicate a likelihood that a user associated with the user profile 304 is likely to register for or act upon the candidate recommendation(s) compared to the other candidate recommendations of the plurality of candidate recommendations. The content item can be provided to a user through a client device associated with the user profile 304. For example, the content item can be displayed on the client device through a user interface of the client device. The candidate recommendations can be ordered within the display based in part on the match score generated for the respective candidate recommendation. For example, a first candidate recommendation having a highest or greatest match score can be listed first or more prominently within the display of the content item on the client device. A second candidate recommendation having a second highest or second greatest match score can be listed second or less prominently within the display of the content item on the client device. A third candidate recommendation having a lowest or least player match score can be listed last or less prominently within the display of the content item on the client device.

In embodiments, the content management system 302 can determine position of one or more candidate recommendations forming a content item within a display of a client device based in part on the match score. For example, candidate recommendations having a greater match score can be positioned having a greater prominence as compared to other candidate recommendations having a lower prominence. The content management system 302 can determine a position of a first candidate item having a first match score. The first match score can correspond to the highest or greatest match score as compared to match scores of other candidate recommendations of the plurality of candidate recommendations. The content management system 302 can select or assign a first position within the display having a greatest prominence. For example, the prominent position with the display can include, but not limited to, a top portion and/or a start of a list of the candidate recommendations. The prominence of a candidate recommendation can be modified using features of the display, such as a stylistic feature (e.g. a particular text style (which can specify a size, a font, underlining, bold, italics, or another style, and in some embodiments the style is different than the another style used for a different candidate recommendation), a visual indicator (e.g. a box, circle, or other visual indicator that surrounds or is otherwise positioned relative to the candidate reference), or any other appropriate feature.

The content management system 302 can position and/or display other candidate recommendations having less prominence or in a less prominent position within the display as compared to the candidate recommendations having a higher or greater match score. Thus, the candidate recommendations forming a content item and having the highest or greatest match score can be positioned and/or displayed with a greater prominence to increase a likelihood that a user associated with the user profile 304 is likely to act upon the candidate recommendation(s) compared to the other candidate recommendations of the plurality of candidate recommendations. The content item may be a content item 1002.

Figure 9:
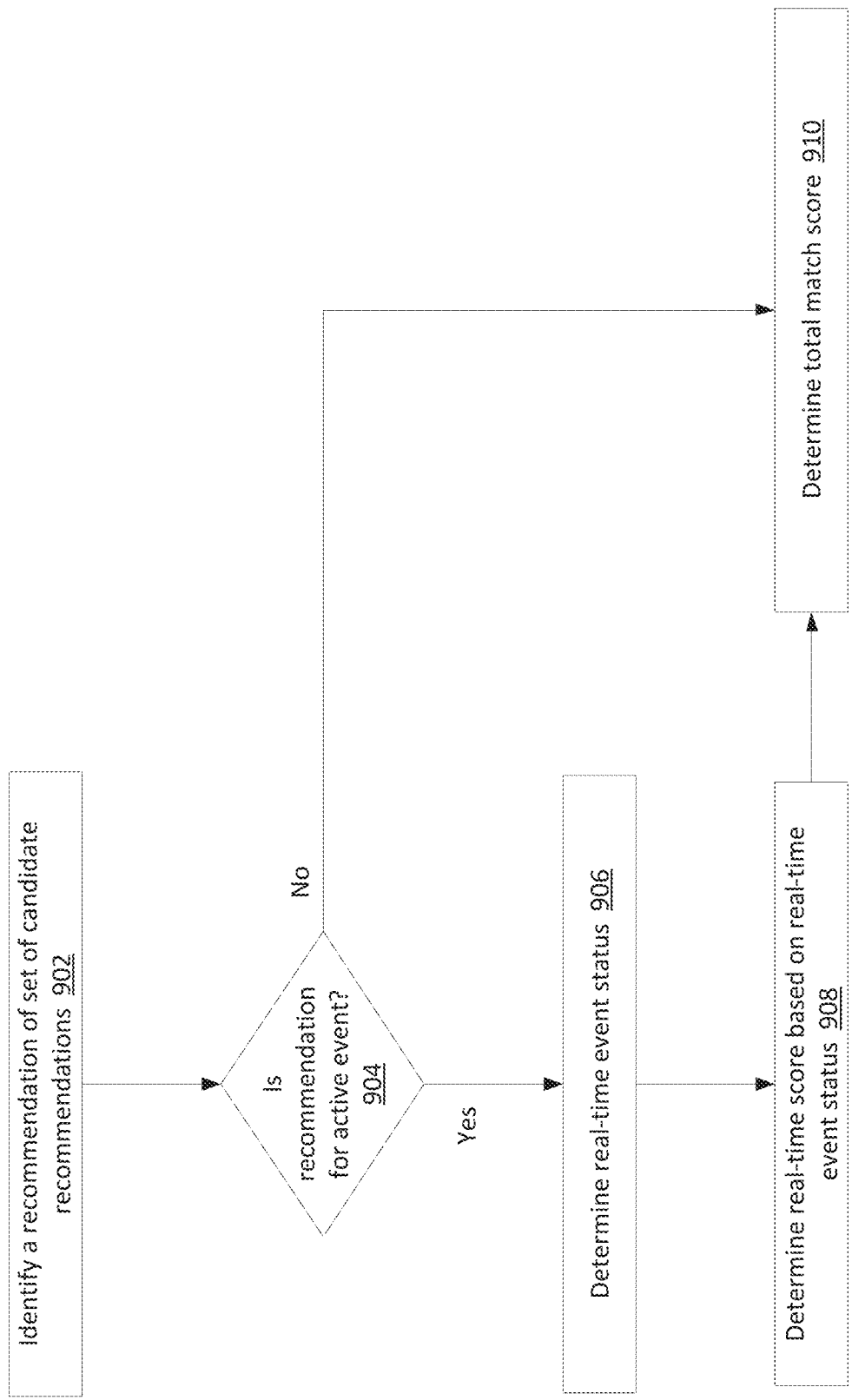
FIG. 9 is a flow chart depicting one or more embodiments of a process for determining a match score based on a real-time event in accordance with one embodiment of the present disclosure.

Referring now to FIG. 9, FIG. 9 shows an example embodiment of a process for providing a determining a real-time score (e.g. as a sub-score for a total candidate recommendation match score). This can be used to assign match points to a candidate recommendation based on a real-time event or status. The process can be performed by the recommendation matcher 312.

In a brief overview, the recommendation matcher 312 can identify a recommendation of a set of candidate recommendations (BLOCK 902). The recommendation matcher 312 can determine the identified candidate recommendation is for an active event or game (BLOCK 904). If the candidate recommendation is determined not to be for an active event or game, the process can proceed to BLOCK 910, and the recommendation matcher 312 can determine a total match score for the candidate recommendation (e.g. without implementing a real-time event score). Otherwise, the process can proceed to BLOCK 906. The recommendation matcher 312 can determine a real-time event status for the candidate recommendation (BLOCK 906). The recommendation matcher 312 can determine a real-time score based on the real-time event status (BLOCK 908). The recommendation matcher 312 can determine a total match score (e.g. based on the real-time score) (BLOCK 910).

In more detail, at BLOCK 902, the recommendation matcher 312 can identify a candidate recommendation of a set of candidate recommendations for analysis. In some embodiments the recommendation matcher 312 can identify a candidate recommendation of a set of candidate recommendations that satisfy one or more predetermined conditions, such as having an initial match score (e.g. based on one or more of a player relevance score, a team relevance score, or a point category relevance score) equal to or above a threshold. The candidate recommendations can be generated by one or more third-party servers that are configured to generate recommendations. A third-party server that generates these candidate recommendations may be configured to allow users to act on the recommendations by establishing a user account with the third-party server. The third-party server can be configured to establish an interface with the content management system 302 through which the content management system 302 can receive one or more candidate recommendations. Furthermore, the content management system 302 can be configured to generate a content item that includes or otherwise references at least one of the candidate recommendations. The content item can be configured to include an actionable object, which a user can take an action on, which causes the client device to cause the content management system 302 to provide data relating to the user profile 304 or account of the user to the third-party server. In this way, the user can engage with the third-party server that generated the candidate recommendation. The user may be required to log into the third-party server. In some embodiments, the user may have an account with the third-party server that is linked to the account of the content management system 302 such that when a user performs an action based on the candidate recommendation, the content management system 302 is configured to communicate the action to the third-party server.

In some embodiments, the content management system 302 can be configured to generate the one or more candidate recommendations. The content management system 302 can be configured to generate these candidate recommendations based on the user profile 304, including the one or more active lineups of the user and on data received from one or more data sources. The data sources can include a game server that provides real-time updates to live sporting events, one or more servers of sportsbooks or other servers that generate odds or lines for live sporting events, among others. The content management system 302 can be configured to generate a recommendation by selecting a player or team from the user's fantasy lineups, a current performance of the player or team and a statistic that the player or team can possibly achieve during the sporting event. The content management system can then determine a likelihood of the player or team achieving the statistic and based on the likelihood, assign a value reflecting the likelihood of the player or team achieving the statistic. The content management system can then generate a recommendation based for the player or team, the statistic that the player or team can possibly achieve and the value. The content management system can generate a large number of candidate recommendations based on various sporting events and store them in the candidate recommendations database for selection.

At BLOCK 904, the recommendation matcher 312 can determine whether the identified candidate recommendation corresponds to an active event or game. An active event or game can be, for example, a real sports game or event that has begun. The candidate recommendation may include a start time for an event or game, and the recommendation matcher 312 can compare the start time to a current time to determine whether the even t or game is active. If the recommendation matcher 312 determines that the candidate recommendation is not active (e.g. has not yet begun), the process can proceed to BLOCK 910, and the recommendation matcher 312 can determine a total match score for the candidate recommendation (e.g. a total match score that does not include a real-time score as a sub-score). If the recommendation matcher 312 determines that the candidate recommendation is active, the process can proceed to BLOCK 906.

At BLOCK 906, the recommendation matcher 312 can determine a real-time event status. The real-time event status can relate to any real-time condition, status, or action of a real event or game. For example, the real-time event status can indicate whether a game is close (e.g. whether a score difference between two teams is equal to or smaller than a threshold), or whether a prediction on a future outcome of the candidate recommendation is close to being satisfied (e.g. whether a total number of points in a game is close to a total number of points corresponding to an over-under prediction on a future outcome (e.g. within a threshold of the over-under)). Such thresholds can be determined based on a time (e.g. a time since the start of the event or game, or a time remaining in the event or game). For example, a first threshold may be implemented for a remaining time that falls within a first predetermined range (e.g. a second-to-last quarter of total game time), and a second threshold may be implemented for a remaining time that falls within a second predetermined range (e.g. e.g. a last quarter of total game time). The second threshold may be smaller than the first threshold. Thus, the recommendation matcher 312 can account for time remaining in a game when determining whether the prediction on a future outcome of the candidate recommendation is close to being satisfied. The real-time status can indicate or can be that a game is close or not (e.g. a binary indication), or can indicate or can be a degree of closeness (e.g. based on a difference between the scores of two teams or a difference between a point total and an under/under line).

Any other real-time condition, status, or action of a real event or game can relate to a real-time event status of the candidate recommendation. For example, the real-time event status of the candidate recommendation can relate to whether one or more points were just scored in a game, or if a team is in a "red-zone" or has been awarded a penalty shot, or if a remaining game time is equal to or below a threshold (or if a time since the start of the game is equal to or above a threshold). A candidate recommendation may have one or more real-time statuses.

At BLOCK 908, the recommendation matcher 312 can determine a real-time score based on the real-time event status. For example, the recommendation matcher 312 can reference a lookup table to determine a number of real-time points to aggregate to the real-time score for the real-time status. The recommendation matcher 312 can determine a real-time score based on a plurality of real-time statuses of the candidate recommendation (e.g. by adding real-time points for each real-time status). In some embodiments, the recommendation matcher 312 can determine the real-time points for a real-time status based on whether a player included in the user profile 304 is associated with the real-time event status. For example, if the real-time event status is that one or more points have just been scored by the player included in the user profile 304, the recommendation matcher 312 can determine additional points or a point multiplier (e.g. based on a player importance score) to aggregate with points indicated by the lookup table.

At BLOCK 910, the recommendation matcher 312 can determine a total match score for the candidate recommendation using the real-time score as a sub-score. By implementing the process shown in FIG. 9, for example, the recommendation matcher 312 can account for real-time events occurring in an event or game that may be relevant to the user profile 304.

In some embodiments, the recommendation matcher 312 can monitor one or more active candidate recommendations, and can determine or update a real-time score for the candidate recommendations (e.g. continuously update a score every predetermined amount of time). The recommendation matcher 312 can determine that the real-time score is above a threshold, and the content management system 302 can responsively determine to provide a content item including a recommendation of the candidate recommendation to a client device.

In some embodiments, the recommendation matcher 312 can monitor one or more real-time event statuses (e.g. indicating a degree of closeness to completing a prediction on a future outcome). The recommendation matcher 312 can determine that the real-time event status is above a threshold, and the content management system 302 can responsively determine to provide a content item including a recommendation of the candidate recommendation to a client device.

In some embodiments, the recommendation system 302 can initiate a recommendation process that analyzes only active candidate recommendations. The recommendation matcher 312 can determine a set of active candidate recommendations, and can determine real-time scores for the active candidate recommendations and can rank the active candidate recommendations based on the real-time scores (e.g. based only on the real-time scores). The content management system 302 may generate a content item that includes a recommendation for one or more of the active candidate recommendations based on the ranking, and can provide the content item to a client device.

Referring now to FIG. 10, a representation of a user fantasy sports lineups profile 1002 is provided. The table 1002 includes a first column listing players included in one or more fantasy sports lineups for a user. The table 1002 includes that second column that indicates the number of fantasy sports lineups the respective player is included within. Thus, the user fantasy sports lineups profile 1002 can be used to identify a frequency of a player used within different fantasy sports lineups based on players (e.g., fantasy players) included in active or previous fantasy sports lineups and generate recommendations 309, such but not limited to, bet recommendations 309 for the user associated with the user fantasy sports lineups profile 1002 or other users having the same players included within their respective fantasy sports lineups profile 1002.

For example, player A is included in 10 fantasy sports lineups used by the respective user for fantasy sports contests. Player B is included in 15 fantasy sports lineups used by the respective user for fantasy sports contests. Player C is included in 13 fantasy sports lineups used by the respective user for fantasy sports contests. Player D is included in 21 fantasy sports lineups used by the respective user for fantasy sports contests. Player E is included in 11 fantasy sports lineups used by the respective user for fantasy sports contests. Player F is included in 17 fantasy sports lineups used by the respective user for fantasy sports contests. Player G is included in 16 fantasy sports lineups used by the respective user for fantasy sports contests.

The content management system 302 can determine player patterns for the respective user to generate future recommendations 309 for the respective user or similar users based on the information provided by the user fantasy lineups profile 1002. For example, the content management system can identify a player or multiple players that are used in multiple fantasy sports lineups or a number that is equal to or greater than a lineup threshold. The lineup threshold can correspond to a threshold value that indicates a frequently used player. The content management system 302 can correlate the frequently used players to a bet history (e.g., FIG. 11) for the user to determine how often the user placed bets with the fantasy sports lineup having the player, the bet type and/or a value of the bet. Thus, if the user or similar users have at least one of the frequently used players in at least one active fantasy sports lineup they are currently using, a recommendation 309 can be made to the user to place a similar bet, bet type, and/or bet with the same value to the user or similar users.

Referring now to FIG. 11, a table showing a representation of a bet history 1102 for a user is provided. The table 1102 can be used to identify relationships between particular bets, bet types, bet amounts, and/or fantasy sports lineups made by a user. The bet history 1102 can correspond to a bet history for a single user or multiple users.

The table 1102 includes a first column identifying the particular bet (e.g., bet A, bet B, etc.). The table 1102 includes a second column identifying whether the bet was for a parlay bet or a single bet. The table 1102 includes a third column identify a bet type (e.g., type 1, type 2, etc.) for a bet. In embodiments, the bet type can include, but not limited to, moneyline bets, spread bets, or over/under bets. The table 1102 can include a fourth column identifying whether the bet was a pre-game bet (e.g., before contest begins) or a live in-game bet (e.g., real-time bets, play-byplay bets). The table 1102 includes a fifth column identifying bet amounts for the corresponding bet. The table 1102 includes a sixth column identifying a fantasy sports lineup used for the particular bet.

The content management system 302 can generate recommendations 309 for the user or similar user based in part on the information provided by the user fantasy sports profile 1002 and bet history 1102. For example, the content management system 302 can use properties from the user fantasy sports profile 1002 and/or bet history 1102 to determine betting patterns for a user of group of users based in part on the bet history 1102. In embodiments, the content management system 302 can determine that player A is included in the first fantasy sports lineup (e.g., fantasy sports lineup 1) for the user. The content management system 302 can identify the number of times the user has used the fantasy sports lineup 1 to place bets and properties of the bets placed using fantasy sports lineup 1. For example, and referring still to FIG. 11, the content management system 302 can determine that the user places parlay bets using the fantasy sports lineup 1 and typically bets on the moneyline as a pregame bet. In embodiments, the content management system 302 can generate one or more recommendations 309 (e.g., bet recommendations) for the user or similar users when player A appears in a fantasy sports lineup based in part on the information from the user fantasy sports profile 1002 and bet history 1102. For example, for a user having an active fantasy sports lineup or a subsequent fantasy sports lineup having player A, the content management 302 can generate a first recommendation 309 to place a parlay bet as a pre-game bet. The content management 302 can generate a second recommendation 309 to place a moneyline bet as a pre-game bet. The content management 302 can generate a third recommendation 309 to place a parlay bet using the moneyline as a pre-game bet. The number of recommendations can vary and can be selected based at least in part on the properties of the user fantasy sports profile 1002 and bet history 1102. The content management system 302 can determine that a predetermined percentage of time, when a particular player is included within a fantasy sports lineup, the user has placed first bet. The content management system 302 can generate recommendations 309 for the user or similar users (e.g., having fantasy sports lineups with the respective player) of the first bet type. The content management system 302 can determine betting patterns using the bet history 1102 to generate a plurality of recommendations 309 for future bets for the user or similar users.

Referring now to FIG. 12, a comparison table 1202 is provided showing a relationship or correlation between different users fantasy sports lineups using a similarity score. The similarity score can be used to determine users having similar players in their respective fantasy sports lineups and to generate recommendations for users or groups of users based on properties from the user fantasy sports profile 1002 and/or bet history 1102 of one or more different users. The comparison table 1202 includes a first column listing a plurality of fantasy sports lineups for a first user or user A. The comparison table 1202 includes a second column listing a plurality of fantasy sports lineups for a second user or user B. The comparison table 1202 includes a third column listing a similarity score generated based on a similarity between the corresponding fantasy sports lineup for user A as compared to the corresponding fantasy sports lineup for user B.

The content management system 302 can determine at least one similarity score for each fantasy sports lineup comparison. The similarity score can correspond to the number of common players included within both compared fantasy sports lineups. The content management system 320 can use the similarity scores to generate, provide or otherwise propagate recommendations 309 to multiple users based in part on existing players or players previously used in fantasy sports lineups. For example, the content management system can compare a first fantasy sports lineup (e.g., fantasy sports lineup 1) for a first user to a first fantasy sports lineup (e.g., fantasy sports lineup 2) for a second user. The content management system 302 can determine if any of the players included in the fantasy sports lineups are common (e.g., included in both) to both fantasy sports lineups. The content management system 302 can generate a similarity score based on the number of common players included in the compared fantasy sports lineups. In some embodiments, the content management system 302 can compare the similarity score to a similarity threshold to determine if recommendations generated based on the players from the compared fantasy sports lineups should be provided to both associated users. The content management system 302 can determine to provide recommendations generated for the first user or the second user based on at least one player from at least one of the compared fantasy sports lineups to other of the first user of the second user. For example, if two fantasy sports lineups have a similarity score over the similarity threshold, the content management system 302 can generates a recommendation 309 for a first user based on players from the first fantasy sports lineup of the first user, the content management system 302 can provide or recommend the same recommendation 309 to a second user having at least one fantasy sports lineup with a similarity score in view of the first fantasy sports lineup of the first user over the similarity threshold.

Thus, the content management system can generate recommendations 309 for a single user or multiple users having similar fantasy sports lineups with one or more players common to the players included in the compared fantasy sports lineups based in part on at least one of a user fantasy sports lineup profile 1002, the bet history 1102, a similarity score, or a combination of the user fantasy sports lineup profile 1002, the bet history 1102, a similarity score. For example, the content management system 302 can generate bet recommendations 309 for a user or group of users based on active fantasy sports lineups (e.g., existing fantasy sports lineups), active players included in one or more fantasy sports lineups, previous fantasy sports lineups (e.g., existing fantasy sports lineups), and/or previous players included in one or more fantasy sports lineups.

It should be appreciated that although the specification and claims refer to fantasy sports, the application is not limited to fantasy sports. Rather, the scope of the application may extend to other contexts where a content management system maintains or accesses a database of one or more candidate recommendations that informs a recommendation selection or recommendation policy.

The invention claimed is:

1. A method for providing content items identifying recommendations based on fantasy sports lineups, comprising:
   identifying, by a server including one or more processors, for a first user profile, at least one active fantasy sports lineup including a list of players included in a fantasy sports contest hosted by the fantasy sports server and one or more previous fantasy sports lineups, the fantasy sports contest associated with a plurality of real sporting events;
   generating, by the server, using the at least one active fantasy sports lineup and the one or more previous fantasy sports lineups, for a user, a recommendation profile, the recommendation profile including a plurality of relevance scores based on the players included in the at least one active fantasy sports lineup and the one or more previous fantasy sports lineups;
   identifying, by the server, a plurality of candidate recommendations relating to the plurality of real sporting events associated with the fantasy sports contest;
   determining, by the server, for each candidate recommendation of the plurality of candidate recommendations, one or more of the relevance scores indicating a level of relevance between the recommendation profile and the candidate recommendation;

determining, by the server, using the corresponding relevance scores, for each of the plurality of candidate recommendations, a match score indicating a level of relevance between the candidate recommendation and the recommendation profile;

prioritizing, by the server, the plurality of candidate recommendations based on the relevance scores between each candidate recommendation and the recommendation profile;

providing, by the server, to a device associated with the first user profile, a content item identifying a selected candidate recommendation of the plurality of candidate recommendations based on the relevance score between the selected candidate recommendation and the recommendation profile.

2. The method of claim 1, wherein generating, the recommendation profile comprising generating one or more of a player relevance score based on one or more players included in the first user profile, a team relevance score based on one or more players included in the first user profile, and a point category relevance score based on one or more players included in the first user profile.

3. The method of claim 2, wherein generating the one or more relevance scores comprises performing a weighted aggregation using one or more of a player importance weight, a contest importance weight, and a contest recency weight.

4. The method of claim 1, wherein determining the match score indicating the level of relevance between the candidate recommendation and the recommendation profile includes performing a weighted aggregation of the relevance scores of the recommendation profile that correspond to the candidate recommendation.

5. The method of claim 1, wherein identifying further comprises identifying one or more user attributes included in the first user profile, the user attributes corresponding to the user associated with the first user profile.

6. The method of claim 5, further comprising:
selecting one or more user attributes from the user profile; and
generating the recommendation profile using players corresponding to the user attributes form the user profile, the players included in the at least one active fantasy sports lineup or the one or more previous fantasy sports lineups.

7. The method of claim 6, further comprising:
determining one or more relevance scores for the players corresponding to the user attributes; and
ranking the players corresponding to the user attributes within the recommendation profile based on the one or more relevance scores.

8. The method of claim 1, wherein determining the match score further comprises determining for each of the plurality of candidate recommendations, the match score using one or more user attributes from the first user profile.

9. The method of claim 1, further comprising selecting for the first content item two or more candidate recommendations of the plurality of candidate recommendations, the two or more candidate recommendations of the plurality of candidate recommendations having corresponding match scores greater than a match score threshold.

10. The method of claim 9, further comprising determining a position within a display of the device associated with the first user profile for the each of the selected two or more candidate recommendations, the position for the each of the selected two or more candidate recommendations based on the corresponding match scores for the two or more candidate recommendations.

11. The method of claim 1, further comprising dynamically modifying the match score for each of the plurality of candidate recommendations responsive to changes to one or more user attributes of the first user profile.

12. A system for providing content items identifying recommendations based on fantasy sports lineups, comprising:
a processor; and
memory storing machine-readable instructions that, when read by the processor, cause the processor to perform processes that include:
identifying, for a first user profile, at least one active fantasy sports lineup including a list of players included in a fantasy sports contest hosted by the fantasy sports server and one or more previous fantasy sports lineups, the fantasy sports contest associated with a plurality of real sporting events;
generating, using the at least one active fantasy sports lineup and the one or more previous fantasy sports lineups, for a user, a recommendation profile, the recommendation profile including a plurality of relevance scores based on the players included in the at least one active fantasy sports lineup and the one or more previous fantasy sports lineups;
identifying a plurality of candidate recommendations relating to the plurality of real sporting events associated with the fantasy sports contest;
determining, for each candidate recommendation of the plurality of candidate recommendations, one or more of the relevance scores indicating a level of relevance between the recommendation profile and the candidate recommendation;
determining, using the corresponding relevance scores, for each of the plurality of candidate recommendations, a match score indicating a level of relevance between the candidate recommendation and the recommendation profile;
prioritizing the plurality of candidate recommendations based on the relevance scores between each candidate recommendation and the recommendation profile;
providing, to a device associated with the first user profile, a content item identifying a selected candidate recommendation of the plurality of candidate recommendations based on the relevance score between the selected candidate recommendation and the recommendation profile.

13. The system of claim 12, wherein generating, the recommendation profile comprising generating one or more of a player relevance score based on one or more players included in the first user profile, a team relevance score based on one or more players included in the first user profile, and a point category relevance score based on one or more players included in the first user profile.

14. The system of claim 12, wherein generating the one or more relevance scores comprises performing a weighted aggregation using one or more of a player importance weight, a contest importance weight, and a contest recency weight.

15. The system of claim 14, wherein determining the match score indicating the level of relevance between the candidate recommendation and the recommendation profile includes performing a weighted aggregation of the relevance scores of the recommendation profile that correspond to the candidate recommendation;

identifying one or more user attributes included in the first user profile, the user attributes corresponding to the user associated with the first user profile.

16. The system of claim 12, further comprising:

selecting one or more user attributes from the user profile; and generating the recommendation profile using players corresponding to the user attributes form the user profile, the players included in the at least one active fantasy sports lineup or the one or more previous fantasy sports lineups.

17. The system of claim 16, further comprising:

determining one or more relevance scores for the players corresponding to the user attributes; and ranking the players corresponding to the user attributes within the recommendation profile based on the one or more relevance scores.

18. The system of claim 12, further comprising selecting for the first content item two or more candidate recommendations of the plurality of candidate recommendations, the two or more candidate recommendations of the plurality of candidate recommendations having corresponding match scores greater than a match score threshold.

19. The system of claim 18, further comprising determining a position within a display of the device associated with the first user profile for the each of the selected two or more candidate recommendations, the position for the each of the selected two or more candidate recommendations based on the corresponding match scores for the two or more candidate recommendations.

20. The system of claim 12, further comprising dynamically modifying the match score for each of the plurality of candidate recommendations responsive to changes to one or more user attributes of the first user profile.

* * * * *